United States Patent
Suzuki et al.

(10) Patent No.: US 9,317,381 B2
(45) Date of Patent: Apr. 19, 2016

(54) STORAGE SYSTEM AND DATA MANAGEMENT METHOD

(71) Applicant: Hitachi, Ltd., Tokyo (JP)

(72) Inventors: Tomohiko Suzuki, Odawara (JP); Keiichi Tezuka, Yokohama (JP); Tetsuya Abe, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 730 days.

(21) Appl. No.: 13/702,195

(22) PCT Filed: Nov. 20, 2012

(86) PCT No.: PCT/JP2012/007459
§ 371 (c)(1),
(2) Date: Dec. 5, 2012

(87) PCT Pub. No.: WO2014/080438
PCT Pub. Date: May 30, 2014

(65) Prior Publication Data
US 2015/0242289 A1    Aug. 27, 2015

(51) Int. Cl.
*G06F 11/00* (2006.01)
*G06F 11/20* (2006.01)
*G06F 11/16* (2006.01)
*G06F 11/34* (2006.01)
(Continued)

(52) U.S. Cl.
CPC .......... *G06F 11/203* (2013.01); *G06F 11/1451* (2013.01); *G06F 11/1464* (2013.01); *G06F 11/1662* (2013.01); *G06F 11/2025* (2013.01); *G06F 11/2035* (2013.01); *G06F 11/2048* (2013.01); *G06F 11/2097* (2013.01); *G06F 11/3433* (2013.01); *H04L 67/1095* (2013.01); *G06F 11/2028* (2013.01); *G06F 11/3466* (2013.01); *G06F 2201/81* (2013.01); *G06F 2201/84* (2013.01)

(58) Field of Classification Search
CPC .............. G06F 11/203; G06F 11/1464; G06F 11/1451; G06F 11/2048; G06F 11/2035; G06F 11/1662; G06F 11/2025; G06F 11/2097; G06F 11/3433; G06F 11/2028; G06F 11/3466; G06F 11/0709; G06F 11/1402; G06F 11/1446; G06F 11/1458; G06F 11/2056; G06F 2201/84; G06F 2201/81; H04L 67/1095
USPC .......................... 714/4.11, 6.3, 43, 47.1, 47.2
See application file for complete search history.

(56) References Cited

U.S. PATENT DOCUMENTS 7,478,275 B1 * 1/2009 Deolasee ............ G06F 11/1458
714/13
2003/0005350 A1 * 1/2003 Koning ............... H04L 67/1002
714/4.11

(Continued)

*Primary Examiner* — Joseph D Manoskey
(74) *Attorney, Agent, or Firm* — Volpe and Koenig, P.C.

(57) ABSTRACT

An efficient disaster recovery system is constructed at three data centers. A data center includes: a business server for executing an application in response to an input/output request; a storage system for providing a first storage area storing data in response to a request from the business server; and a management server for managing a second data center or a third data center among the plurality of data centers as a failover location when a system of a first data center having the first storage area stops; and wherein the management server: copies all pieces of data stored in the first storage area to a second storage area managed by a storage system of the second data center; and copies part of the data stored in the first storage area to a third storage area managed by a storage system of the third data center.

12 Claims, 29 Drawing Sheets

(51) Int. Cl.
*G06F 11/14* (2006.01)
*H04L 29/08* (2006.01)

(56) References Cited

U.S. PATENT DOCUMENTS

| | | |
|---|---|---|
| 2003/0051111 A1 | 3/2003 | Nakano et al. |
| 2004/0243650 A1* | 12/2004 | McCrory .............. G06F 9/5061 |
| 2007/0078982 A1 | 4/2007 | Aidun et al. |
| 2008/0313242 A1 | 12/2008 | Doerr |
| 2009/0271658 A1 | 10/2009 | Aidun |
| 2012/0136833 A1 | 5/2012 | Bartholomy et al. |
| 2012/0173919 A1 | 7/2012 | Patel et al. |
| 2013/0117223 A1* | 5/2013 | Niki .................. G06F 17/30221 707/610 |
| 2013/0124916 A1* | 5/2013 | Shutt ....................... G06F 17/30 714/6.3 |

\* cited by examiner

FIG. 6

| AP NAME | SERVER RESOURCE AMOUNT | NETWORK RESOURCE AMOUNT | STORAGE RESOURCE AMOUNT |
|---|---|---|---|
| AP1 | 100 | 100 | 200 |
| AP2 | 50 | 50 | 50 |
| ... | ... | ... | ... |

| DC NAME | SERVER RESOURCES | | | NETWORK RESOURCES | | | STORAGE RESOURCES | | | ACTIVE AP(S) |
|---|---|---|---|---|---|---|---|---|---|---|
| | TOTAL RESOURCE AMOUNT | USED RESOURCE AMOUNT | REMAINING RESOURCE AMOUNT | TOTAL RESOURCE AMOUNT | USED RESOURCE AMOUNT | REMAINING RESOURCE AMOUNT | TOTAL RESOURCE AMOUNT | USED RESOURCE AMOUNT | REMAINING RESOURCE AMOUNT | |
| DC1 | 300 | 100 | 200 | 150 | 50 | 100 | 3000 | 1000 | 2000 | AP1,AP2 |
| DC2 | 100 | 50 | 50 | 25 | 25 | 25 | 1000 | 500 | 500 | ... |
| DC3 | 500 | 100 | 400 | 250 | 50 | 200 | 5000 | 1000 | 4000 | ... |

| DC NAME | ACTIVE AP(S) | ACTIVE VOLUMES | | |
|---|---|---|---|---|
| | | P-vol | S1-vol | S2-vol |
| DC1 | AP1,AP2 | | ... | ... |
| DC2 | ... | ... | AP1,AP2 | ... |
| DC3 | ... | ... | ... | AP1,AP2 |

| AP NAME | TYPE | LOCATED DC | VOLUME CONFIGURATION ||||||||||
|---|---|---|---|---|---|---|---|---|---|---|---|---|
| | | | P-vol ||| S1-vol ||| S2-vol |||
| | | | DC | Storage# | LUN | DC | Storage# | LUN | DC | Storage# | LUN |
| AP1 | AAA | DC1 | DC1 | 0001 | 01 | DC2 | 0001 | 01 | DC3 | 0001 | 01 |
| AP2 | BBB | DC1 | DC1 | 0002 | 01 | DC2 | 0002 | 01 | DC3 | 0002 | 01 |
| ... | ... | ... | ... | ... | ... | ... | ... | ... | ... | ... | ... |

4041 4042 4043 4044 (4045 P-vol, 4046 S1-vol, 4047 S2-vol)

FIG.10

| POLICY NAME | SERVER | NETWORK | STORAGE |
|---|---|---|---|
| FOR DR CONSTRUCTION | 0 | 0 | 0 |
| FOR FAILOVER | 1 | 1 | 0 |
| ... | ... | ... | ... |

P-Vol

| PAGE NUMBER | WRITE LOCATION ADDRESS | Tier |
|---|---|---|
| 1 | 100 | 1 |
| 2 | 201 | 2 |
| ... | ... | ... |

4061　4062　4063　　406A

S2-Vol (PARTIAL COPY)

| PAGE NUMBER | WRITE LOCATION ADDRESS | Tier |
|---|---|---|
| 1 | 100 | 1 |
| 2 | – | 2 |
| ... | ... | ... |

| DC NAME | COST LEVEL |
|---|---|
| DC1 | 3 |
| DC2 | 2 |
| DC3 | 1 |
| ... | ... |

| AP NAME | ACCOUNTING LEVEL |
|---|---|
| AP1 | 3 |
| AP2 | 2 |
| AP3 | 1 |
| ... | ... |

5021 5022   502

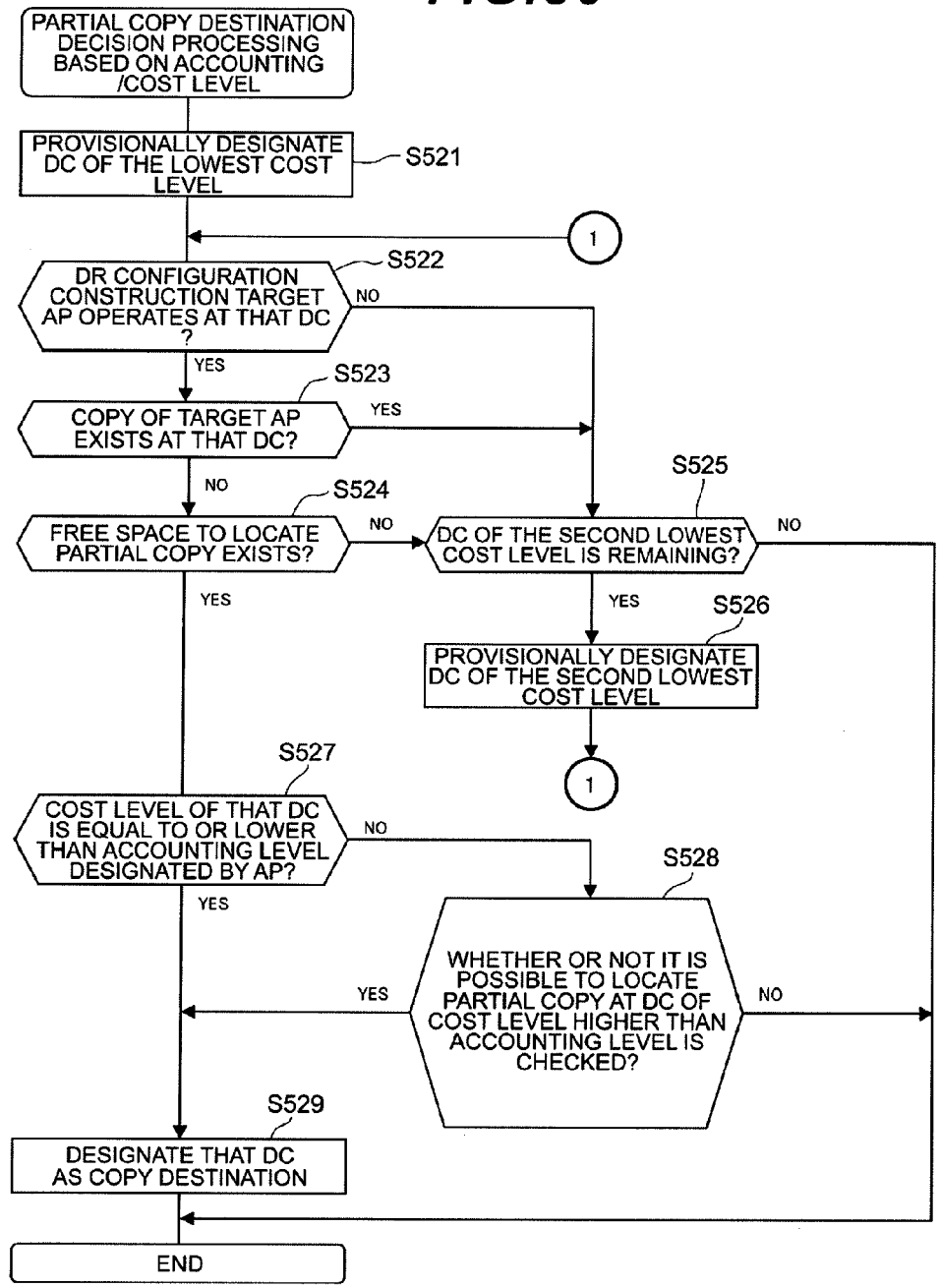

STORAGE SYSTEM AND DATA MANAGEMENT METHOD

TECHNICAL FIELD

The present invention relates to a storage system and a data management method and is suited for use in a storage system and data management method for constructing a disaster recovery system between the storage system and other storage systems.

BACKGROUND ART

Recently, awareness of the importance of safe data storage and retainment has been being heightened and demands for the disaster recovery system have been increasing in a data storage market. When some failure occurs at a data storage base, where data is stored (hereinafter referred to as the data center), and a system stops, the disaster recovery system is a system for switching services to another system to continue the services and minimizing the damage caused by the system stop.

Conventionally, the disaster recovery system where two data centers are provided and the two points are connected has been realized. However, if the disaster recovery system is constructed at the two data centers and a failure occurs at one data center, only the other data center continues services, thereby increasing a load and significantly degrading performance.

So, PTL 1 discloses a technique to construct a disaster recovery system at three or more data centers. The disaster recovery system of PTL 1 guarantees data ordinality and eliminates data inconsistency by taking over the data update status between the data centers.

CITATION LIST

Patent Literature

[PTL 1]
US 2003/0051111 A1

SUMMARY OF INVENTION

Technical Problem

However, if the disaster recovery system is constructed at three or more data centers, the same data has to be shared by all the data centers, thereby causing problems of wasteful use of bandwidths and resources for data transfer. The present invention was devised in consideration of the above-described circumstances and aims at suggesting storage system and data management method capable of constructing an efficient disaster recovery system for three or more data centers.

Solution to Problem

In order to solve the above-described problems, the present invention provides a storage system for managing a plurality of data centers, wherein the data center includes: a business server for executing an application in response to an input/output request; a storage system for providing a first storage area storing data in response to a request from the business server; and a management server for managing a second data center or a third data center among the plurality of data centers as a failover location when a system of a first data center having the first storage area stops; and wherein the management server copies all pieces of data stored in the first storage area to a second storage area managed by a storage system of the second data center and copies part of the data stored in the first storage area to a third storage area managed by a storage system of the third data center.

According to the above-described configuration, a disaster recovery system is constructed from the first data center, the second data center, and the third data center; all pieces of data stored in the first storage area of the first data center are copied to the second storage area of the second data center; and part of the data stored the first storage area of the first data center is copied to the third storage area of the third data center. Accordingly, with the disaster recovery system constructed from three or more data centers, only part of the first storage area of the first data center is copied to the third storage area of the third data center, so that consumption of resources such as bandwidths and CPUs required for data transfer as well as the storage area capacity can be cut down and the efficient disaster recovery system can be constructed.

Advantageous Effects of Invention

According to the present invention, the efficient disaster recovery system at three or more data centers can be constructed and wasteful use of bandwidths and resources for data transfer can be prevented.

BRIEF DESCRIPTION OF DRAWINGS

FIG. 6 is a chart showing an example of an AP performance requirement management table according to the embodiment.

FIG. 7 is a chart showing an example of a DC resource management table according to the embodiment.

FIG. 8 is a chart showing an example of an active resource management table according to the embodiment.

FIG. 9 is a chart showing an example of a DR configuration management table according to the embodiment.

FIG. 10 is a chart showing an example of a policy management table according to the embodiment.

FIG. 11 is a chart showing an example of an intra-volume data arrangement management table according to the embodiment.

FIG. 32 is a chart showing an example of a data center cost level management table according to a second embodiment.

FIG. 33 is an application accounting level management table according to the embodiment.

FIG. 36 is a flowchart illustrating partial copy destination decision processing according to the embodiment.

DESCRIPTION OF EMBODIMENTS

An embodiment of the present invention will be explained below in detail with reference to the attached drawings.

(1) First Embodiment

(1-1) Outline of this Embodiment

Firstly, the outline of this embodiment will be explained. The storage system according to this embodiment includes three or more data centers and a disaster recovery system is constructed at these data centers. When conventionally the disaster recovery system is constructed at two data centers and one of the data centers fails, services are continued at only the other data center and, therefore, a load increases, causing a problem of significant performance degradation.

So, a technique to construct a disaster recovery system at three or more data centers is disclosed. However, if a disaster recovery system is constructed at three or more data centers, all data centers have to share the same data, thereby causing a problem of wasteful use of bandwidths and resources for transfer of the data. Furthermore, if a failover location for the occurrence of a failure(s) is fixed even when the disaster recovery system is constructed at three or more data centers, a load on the data center which is the fixed failover location increases, which may possibly affect services.

Therefore, when the disaster recovery system is constructed at three or more data centers, for example, duplication of data is performed in this embodiment according to the usage of storage recourses at the data centers where the disaster recovery system is constructed. For example, as shown in FIG. 1, the disaster recovery system is constructed at three data centers, that is, a first data center (hereinafter sometimes referred to as DC1) 10a, a second data center (hereinafter sometimes referred to as DC2) 10b, and a third data center (hereinafter sometimes referred to as DC3) 10c.

Figure 1:
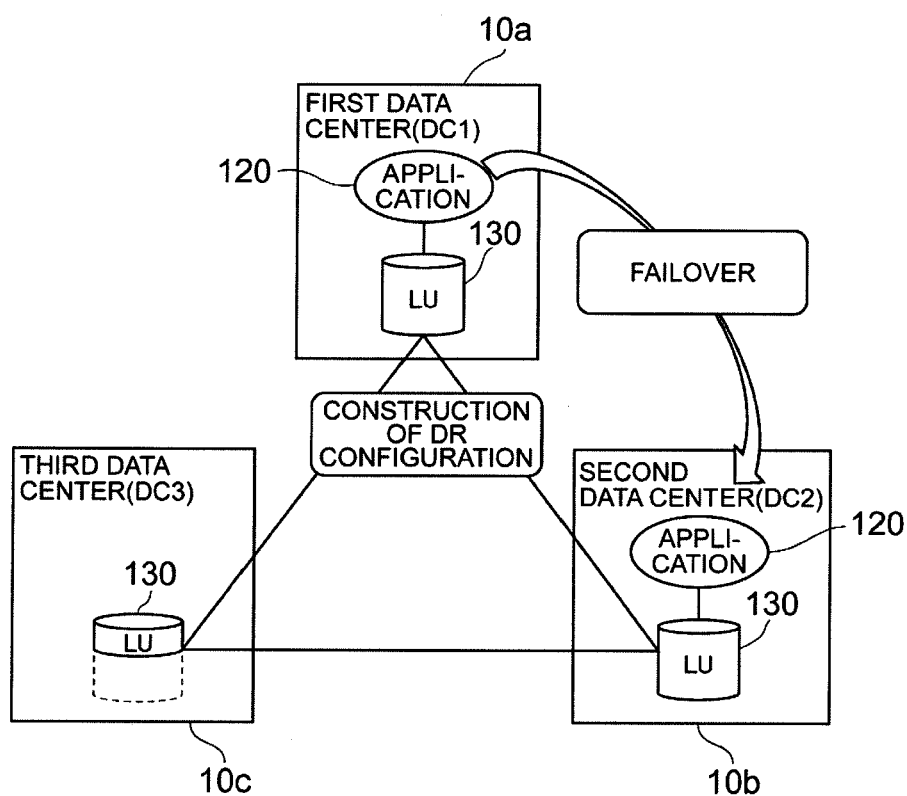
FIG. 1 is a block diagram showing the overall configuration of a first embodiment according to the present invention.

Referring to FIG. 1, the second data center 10b or the third data center 10c is set as a failover location of the first data center 10a. In this embodiment, the disaster recovery system can be constructed according to the usage of storage resources at the two data centers, one of which can become a failover location (first object); a failover can be executed based on the status of unused resources of the relevant data center (second object); and migration can be executed by predicting an increase of load on each data center (third object). The detailed explanation will be give below.

(First Object)

Figure 2A:
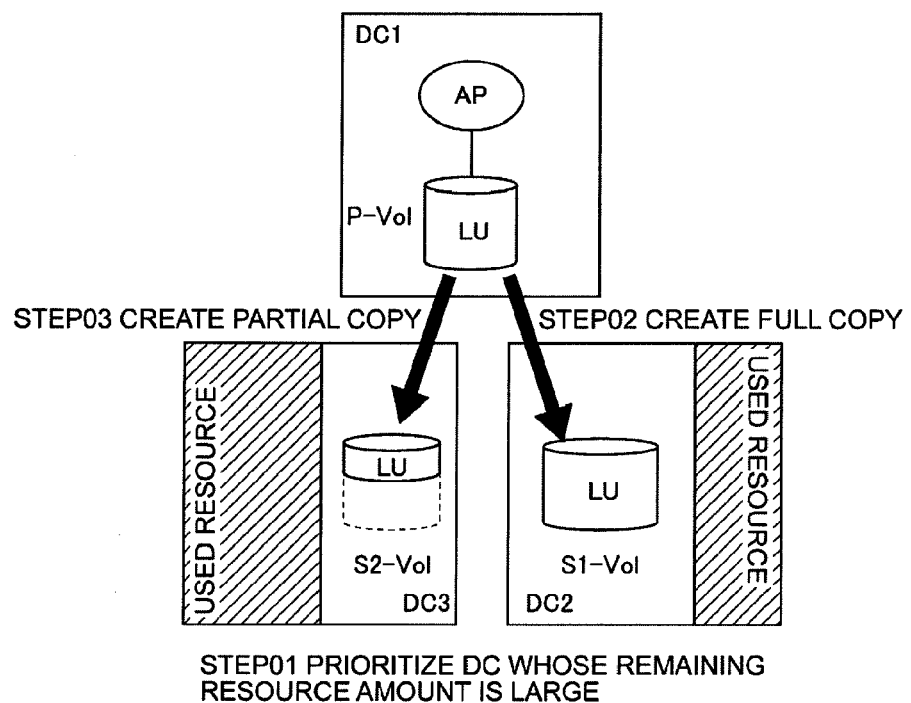
FIG. 2A is a conceptual diagram showing the outline of the embodiment.

When constructing the disaster recovery system at three data centers, a full copy of data is stored in a storage apparatus of one of the two data centers, which may become a failover location, and a partial copy of the data is stored in a storage apparatus of the other data center. For example, the order of priority is set to DC2 and DC3, which may become the failover location, in descending order of a remaining resource rate as shown in FIG. 2A (STEP 01). So, a full copy (S1-Vol) of a primary volume (P-Vol) is created at DC2 with a larger remaining resource amount (STEP 02). Then, a partial copy (S2-Vol) of the primary volume (P-Vol) is created at DC3 with a smaller remaining resource amount.

Since the full copy is stored in the storage apparatus of not all the data centers which may become the failover location, wasteful use of resources such as bandwidths, processors, and a volume capacity that are required for data transfer when constructing the disaster recovery system is prevented.

(Second Object)

Figure 2B:
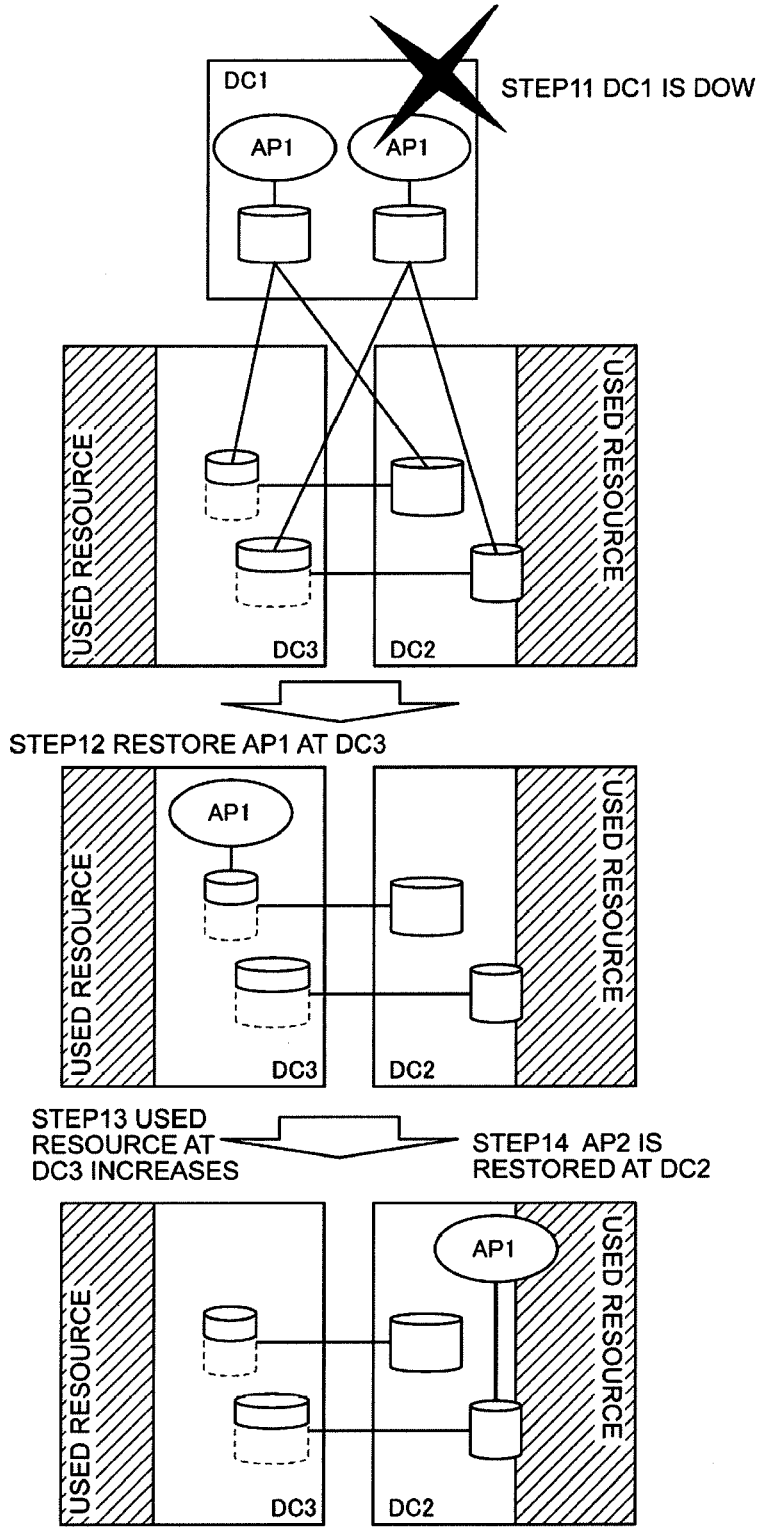
FIG. 2B is a conceptual diagram showing the outline of the embodiment.

Furthermore, if DC1 having the primary volume fails, an application(s) is restored according to an unused resource amount of DC2 and DC3 which may become the failover location. For example, if DC1 goes down due to a failure of DC1 as shown in FIG. 2B (STEP 11), the unused resource amount of DC2 is compared with that of DC3 and AP1 is restored at DC3 with a larger unused resource amount (STEP 12). Since the unused resource amount of DC3 decreases by restoring AP1 at DC3 in STEP 12, AP2 is restored at DC2 whose current unused resource amount is large (STEP 13).

A load bias after the failover can be minimized by deciding the failover location according to the status of the unused resource amount as described above.

(Third Object)

Figure 2C:
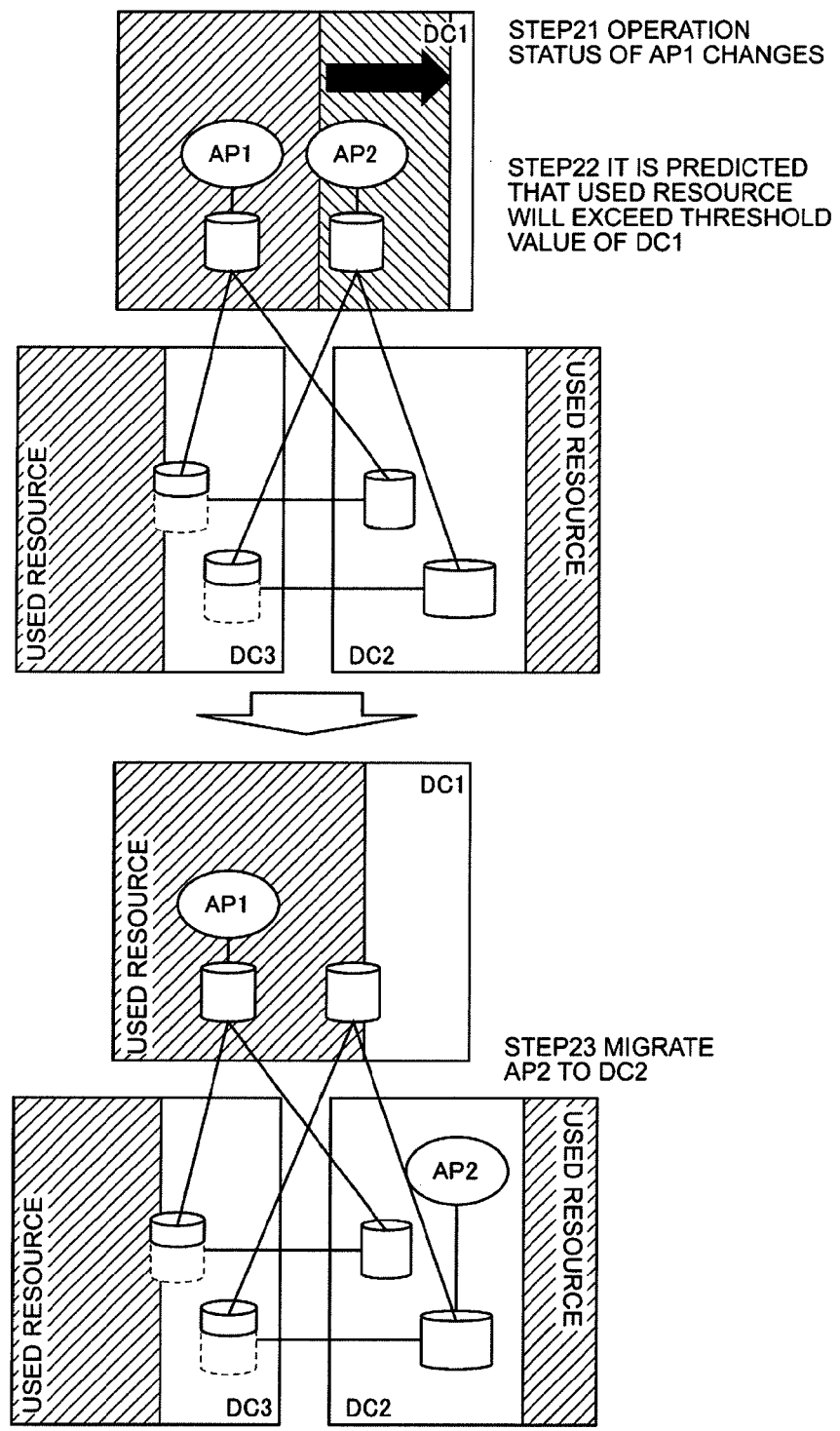
FIG. 2C is a conceptual diagram showing the outline of the embodiment.

Furthermore, changes of the operation status of applications are detected and the applications are migrated before the used resources change. For example, as shown in FIG. 2C, changes of the operation status of the application AP1 are firstly detected (STEP 21). Changes of the operation status of the application AP1 are, for example, changes of the number of users who use the application AP1. Then, changes of used resources along with changes of the operation status as detected in STEP 21 are estimated (STEP 22). If the estimated value exceeds a specified threshold value as a result of the estimation in STEP 22, that is, if it is predicted that the used resource amount would exceed the specified threshold value because of the change of the operation status, the application AP2 whose priority is lower than that of AP1 is migrated (STEP 23). When migrating the application AP2, it is migrated to either DC2 or DC3 whichever has a larger remaining resource amount.

It is possible to migrate the application(s) and distribute the load before an actual increase of the load by predicting the increase of the load on the data centers as described above.

An efficient disaster recovery system can be constructed according to the status of resources of the storage system by realizing the above-described first to third objects. Furthermore, the failover location at the occurrence of disasters and the migration destination can be decided automatically, so that an operation load on a system administrator can mitigated.

(1-2) Configuration of Storage System

Next, the configuration of the storage system will be explained. The storage system according to this embodiment is constructed from three or more data centers as shown in FIG. 1. The storage system constructed from three or more data centers will be explained below. The three data centers constitute a disaster recovery system as described above. Specifically speaking, the first data center (DC1) 10a includes a primary volume and the second data center (DC2) 10b and the third data center (DC3) 10c include secondary volumes that store a full copy or partial copy of the primary volume; and if DC1 goes down due to a failure, DC2 or DC3 becomes a failover location and continues executing applications.

(1-2-1) Hardware Configuration of Data Center

Figure 3:
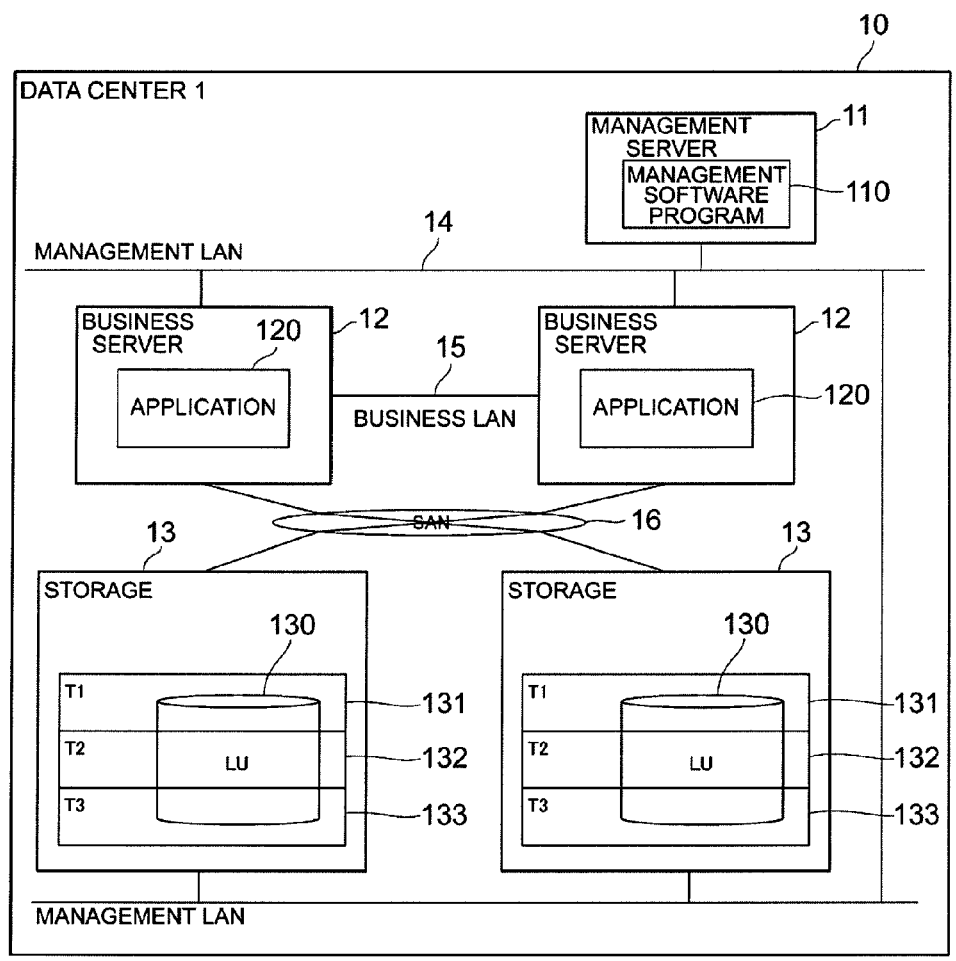
FIG. 3 is a block diagram showing the configuration of a data center according to the embodiment.

Next, the hardware configuration of the data center will be explained. As shown in FIG. 3, the data center 10 is constituted from, for example, a management server 11, business servers 12, and storage apparatuses 13. The management server 11 and the business servers 12 are connected via a management LAN (Local Area Network) 14. The plurality of business servers 12 are connected via a business LAN such as a local area network. Furthermore, the business servers 12 and the storage apparatuses 13 are connected via a network 16 such as a SAN (Storage Area Network).

The management server 11 is a server for managing the entire data center 10. The management server 11 manages the operations of the business servers 12 and the storage apparatuses 13 which operate in the data center 10. The business server 12 executes an application 120 requested in response to, for example, input by a user and sends a read/write request to the storage apparatus 13.

Furthermore, the storage apparatus 13 executes read/write processing on a logical volume 130 in the storage apparatus 13 in response to the data read/write request from the business server 12. The logical volume 130 is provided by one or more storage devices and storage areas provided by the same type of storage devices are managed as the same type of storage tier (Tier). In this embodiment, the logical volume 130 is constituted from three storage tiers: a first storage tier (T1) 131; a second storage tier (T2) 132; and a third storage tier (T3) 133. The storage tiers will be explained later in detail.

(1-2-2) Configuration of Each Device

Figure 4:
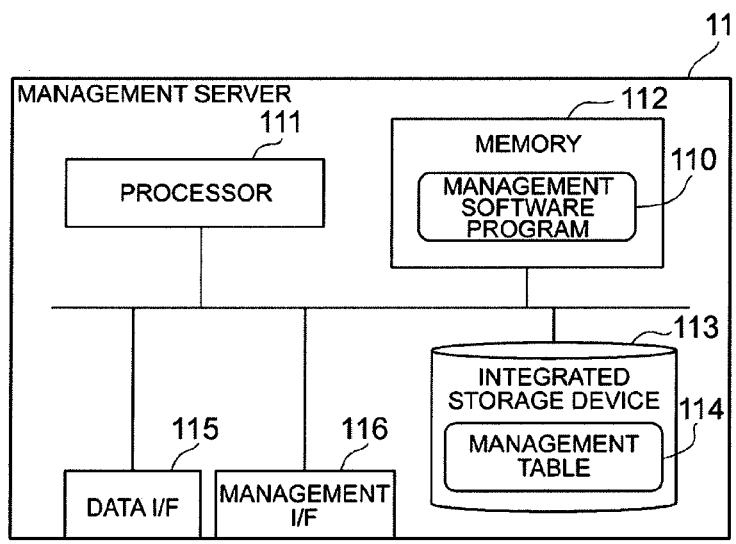
FIG. 4 is a block diagram showing the configuration of a management server according to the embodiment.

Next, the configuration of the management server 11 will be explained with reference to FIG. 4. As shown in FIG. 4, the management server 11 is constituted from, for example, a processor 111, a memory 112, an integrated storage device 113, a data interface (described as the data I/F in the drawing), and a management interface (described as the management I/F in the drawing).

The processor 111 functions as an arithmetic processing unit and controls the operation of the entire management server 11 in accordance with, for example, various programs and operation parameters stored in the memory 112. The memory 112 is composed of, for example, a ROM (Read Only Memory) or a RAM (Random Access Memory) and stores, for example, a management software program 110.

The integrated storage device 113 is composed of, for example, a semiconductor memory such as an SSD (Solid State Drive) and stores various management tables 114 for managing, for example, the configuration in the data center and resources of the storage apparatus 13. The various management tables 114 will be explained later in detail.

The data interface 115 is an interface for accessing data stored in the storage device of the storage apparatus 13 and has a wire or wireless connection function according to the network structure. The management interface 116 is an interface for managing the devices in the data center 10 and has a function obtaining, for example, the resource use status of the storage apparatus 13.

The business server 12 has almost the same hardware configuration as that of the management server 11 and stores an application 120 for performing services is stored in the memory as shown in FIG. 3. The processor for the business server 12 invokes the application 120 from the memory in response to a request and executes specified service processing.

Figure 5:
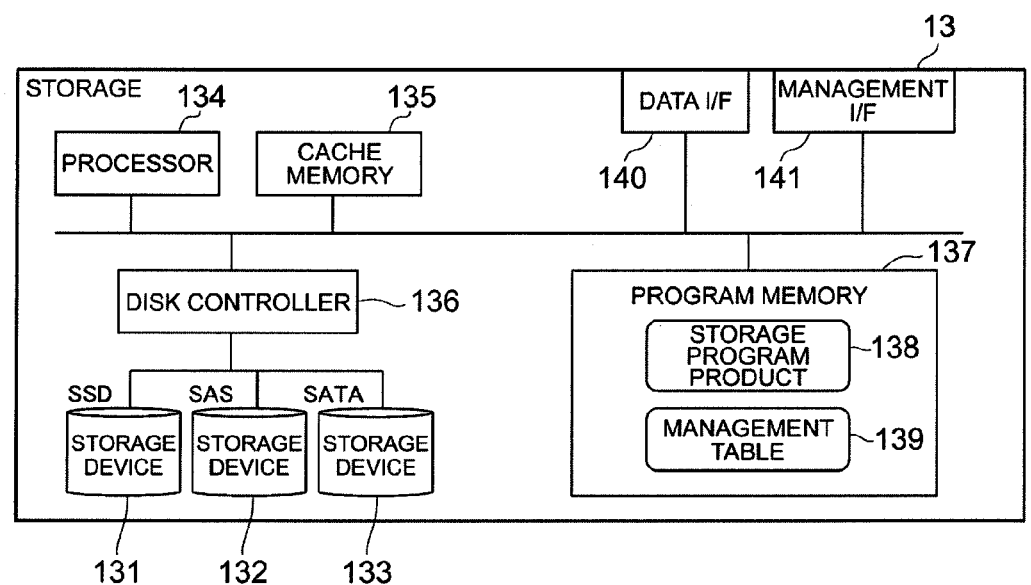
FIG. 5 is a block diagram showing the configuration of a storage apparatus according to the embodiment.

Next, the configuration of the storage apparatus 13 will be explained with reference to FIG. 5. As shown in FIG. 5, the storage apparatus 13 is constituted from a processor 134, a cache memory 135, a disk controller 136, storage devices 131 to 133, a program memory 137, a data interface 140, and a management interface 141.

The processor 134 functions as an arithmetic processing unit and controls the operation of the entire storage apparatus 13 in accordance with, for example, various programs and operation parameters stored in the program memory 137.

The cache memory 135 is a storage device for temporarily storing data which is read from, for example, the storage device 131.

The disk controller 136 manages the storage devices 131 to 133 and controls read/write processing on data stored in the storage devices 131 to 133. The storage device 131 to 133 are composed of, for example, a semiconductor memories such as SSDs (Solid State Drives), expensive and high-performance disk drives such as SAS (Serial Attached SCSI) disks or FC (Fibre Channel) disks, and inexpensive and low-performance disk drives such as SATA (Serial AT Attachment) disks.

The program memory 137 stores: a storage program product 138 for managing data stored in, for example, the storage device 131; and various management tables 139 for managing storage tiers and pages of volumes.

Specifically speaking, the storage program product 138 is a program for controlling, for example, volume virtualization, hierarchical data management, and copying and constituting logical volumes between the storage devices across a plurality of storage apparatuses 13 and a plurality of data centers.

Now, the volume virtualization and the hierarchical control will be explained. The volume virtualization function is called Thin Provisioning and is a function that provides a host computer with virtual logical volumes (hereinafter referred to as the virtual volumes) and dynamically allocates a storage area to a virtual volume when a data write request is issued from the host computer to the virtual volume. Such a thin provisioning function has advantages that: a virtual volume(s) with a larger capacity than that of a storage area which can be actually provided; and a computer system can be constructed at low cost by reducing a physical storage capacity to be prepared in advance in the storage system.

Furthermore, a hierarchical data management method can be an example of the data management method for the storage apparatus equipped with the above described thin provisioning function. The hierarchical data management method is a method of managing each storage area, which is provided by each of a plurality of types of storage devices with different performance mounted on the storage system, as each of different types of storage tiers, allocating a storage area from a high-speed, high-performance, and expensive storage tier to an area storing data of high access frequency in a virtual volume, and allocating a storage area from low-speed, low-performance, and inexpensive storage tier to an area storing data of low access frequency in the virtual volume. If such a hierarchical data management method is employed, cost performance of the storage system can be enhanced.

With the storage apparatus 13 according to this embodiment, one or more storage devices 131, 132 or 133 of the same type (such as SSD, SAS, or SATA) define a RAID group and one or more pool volumes are defined in storage areas provided by one or more storage devices constituting one RAID group. Furthermore, each pool volume defined in a storage area provided by the storage devices of the same type is managed as a storage tier (Tier) of the same type and a plurality of pool volumes belonging to mutually different storage tiers (Tiers) are managed as one pool.

In this embodiment, three types of storage devices which are SSDs, SAS disks, and SATA disks, are used as described above; a pool volume defined in a storage area provided by one or more SSDs is managed as a storage tier called Tier 1; a pool volume defined in a storage area provided by one or more SAS disks is managed as a storage tier called Tier 2; and a pool volume defined in a storage area provided by one or more SATA disks is managed as a storage tier called Tier 3.

Incidentally, among these types of storage devices (SSD, SAS, and SATA), the storage devices which have the highest reliability and response performance and are most expensive are SSDs; the storage devices which have the second highest reliability and response performance and are the second most expensive are SAS disks; and the storage devices which have the lowest reliability and the response performance and the most inexpensive are SATA disks. Accordingly, in the case of this embodiment, the storage tier with the highest reliability and response performance among the three tiers constituting the pool volumes is Tier 1, the storage tier with the second highest reliability and response performance is Tier 2, and the storage tier with the lowest reliability and response performance is Tier 3.

(1-3) Details of Management Tables

Next, the management tables 114 stored in the integrated storage device 113 of the management server 11 will be explained. The management tables explained below show the overall configuration of the three data centers (DC1, DC2, DC3) constituting the disaster recovery system and the same management tables are respectively stored in the management server 11.

Firstly, an AP performance requirement management table 401 will be explained with reference to FIG. 6. The AP performance requirement management table 401 is a table for managing performance requirements demanded by the applications executed by the business server 12.

The AP performance requirement management table 401 is constituted from an AP name column 4011, a server resource amount column 4012, a network resource amount column 4013, and a storage resource amount column 4014 as shown in FIG. 6.

The AP name column 4011 stores the name of the relevant application. The server resource amount column 4012 stores a server resource amount required when executing the application and, for example, stores a score value based on a value measured by a certain application. The network resource amount column 4013 stores a network resource amount required when executing the application and, for example, stores a bps value indicating a data transfer speed. Furthermore, the storage resource amount column 4014 stores a storage resource amount required when executing the application and stores, for example, a TB value indicating a storage capacity.

FIG. 6 shows that when executing the application whose AP name is AP1, the required server resource amount is 100 scores, the network resource amount is 100 bps, and the storage resource amount is 200 TB.

Next, a DC resource management table 402 will be explained with reference to FIG. 7. The DC resource management table 402 is a table for managing the resource amount in each data center.

The DC resource management table 402 is constituted from a DC name column 4021, a server resource column 4022, a network resource column 4023, a storage resource column 4024, and an active AP column 4025 as shown in FIG. 7.

The DC name column 4021 stores the name of the relevant data center. The server resource column 4022 stores information of the server resource of each data center and stores a total server resource amount, a used server resource amount, and a remaining server resource amount. The network resource column 4023 stores information of the network resource of each data center and stores a total network resource amount, a used network resource amount, and a remaining network resource amount. The storage resource column 4024 stores information of the storage resource of each data center and stores a total storage resource amount, a used storage resource amount, and a remaining storage resource amount. The active AP column 4025 stores the name of the applications operating at each data center.

FIG. 7 shows that regarding the data center whose DC name is DC1, the total server resource amount is 300 scores, the used server resource amount is 100 scores, and the remaining server resource amount is 200 scores; the total network resource amount is 150 bps, the used network resource amount is 50 bps, and the remaining network resource amount is 100 bps; the total storage resource amount is 3000 TB, the used storage resource amount is 1000 TB, and the remaining storage resource amount is 2000 TB; and the active applications are AP1 and AP2.

Next, an active resource management table 403 will be explained with reference to FIG. 8. The active resource management table 403 is a table for managing at which data center and in which volume the applications are operating.

The active resource management table 403 is constituted from a DC name column 4031, an active AP column 4032, and an active volume column 4033 as shown in FIG. 8.

The DC name column 4031 stores the name of the relevant data center. The active AP column 4032 stores the name of applications operating at the data center. The active volume column 4033 stores active volume information of the applications at each data center.

FIG. 8 shows that the applications AP1 and AP2 operate in a primary volume (P-Vol) at DC1, operate in a secondary volume (S1-Vol), which is a full copy of the primary volume, at DC2, and operate in a secondary volume (S2-Vol), which is a partial copy of the primary volume, at DC3.

Next, a DR configuration management table 404 will be explained with reference to FIG. 9. The DR configuration management table 404 is constituted from an AP name column 4041, a type column 4042, a located DC column 4043, and a volume configuration column 4044.

The AP name column 4041 stores the name of the relevant application. The type column 4042 stores the name of the application type. The located DC column 4043 stores the name of a data center where the application is located. The volume configuration column 4044 stores configuration information about the primary volume (P-Vol), the secondary volume (S1-Vol), which is a full copy of the primary volume, and the secondary volume (S2-Vol) which is a partial copy of the primary volume. Regarding the configuration information of each volume, the volume configuration column 4044 stores the name of the data center where the relevant volume is located, and the name of the storage apparatus and the logical unit number (LUN) in the relevant data center.

FIG. 9 shows that the application type of the application AP1 is AAA and the application AP1 is located at the data center DC1. Furthermore, the primary volume where AP1 operates is LUN01 with the storage number 0001 at DC1, the full copy secondary volume is LUN01 with the storage number 0001 at DC2, and the partial copy secondary volume is LUN01 with the storage number 0001 at DC3.

Next, a policy management table 405 will be explained with reference to FIG. 10. The policy management table 405 is a table for managing which resource should be prioritized when comparing the resources of the data centers.

The policy management table 405 is constituted from a policy name column 4051, a server column 4052, a network column 4053, and a storage column 4054 as shown in FIG. 10. The policy name column 4051 stores information at the point in time of processing for referring to the relevant policy to see, for example, whether the relevant policy is a policy at the time of the disaster recovery system construction or a policy at the time of the failover. The server column 4052, the network column 4053, and the storage column 4054 store flags indicating which resource should be prioritized.

FIG. 10 shows that there is no resource that should be particularly prioritized when comparing the resources at the data centers at the time of the DR construction. Furthermore, FIG. 10 shows that at the time of the failover, the resources are compared by prioritizing the server resource and the network resource.

Next, intra-volume data arrangement management tables 406A and 406B will be explained with reference to FIG. 11. Each intra-volume data arrangement management table 406A, 406B is a table for managing the data arrangement in each volume and exists for each volume.

As shown in FIG. 11, each of the intra-volume data arrangement management table 406A for the primary volume (P-Vol) and the intra-volume data arrangement management table 406B for the partial copy secondary volume (S2-Vol) is constructed from a page number column 4061, a write location address column 4062, and a tier column 4063.

The page number column 4061 stores the page number of the relevant volume. The write location address column 4062 stores address information of the data write location. The tier column 4063 stores tier information about a storage area which is the write location.

FIG. 11 shows that the relevant data is stored at address 100 on page 1 of the primary volume (P-Vol) and the data write location tier is Tier 1; and similarly, the relevant data is stored at the write location address 100 on page 1 of the partial copy secondary volume (S2-Vol) and the data write location tier is Tier 1. Furthermore, since data to be copied to the partial copy secondary volume (S2-Vol) is only data stored in the storage area in the highest tier (Tier 1), this shows that data in Tier 2 of the primary volume (P-Vol) is not copied to the secondary volume (S2-Vol).

(1-4) Details of Each Processing

Next, the details of each processing in the storage system constructed from the three data centers will be explained in detail.

(1-4-1) Disaster Recovery Configuration Construction Processing

Firstly, processing for constructing a disaster recovery configuration (DR configuration) with reference to FIG. 12 to FIG. 15 will be explained. The following explanation will be given by hereinafter referring to a full copy of the primary volume as the first secondary volume (S1-Vol) and a partial copy of the primary volume as the second secondary volume (S2-Vol).

The disaster recovery configuration construction processing described below is executed by the management software program 110 for DC1. Incidentally, a processing subject of various processing will be explained below as a program; however, it is a matter of course that the processor 111 of the management server 11 or the processor 134 of the storage apparatus 13 executes the processing based on that program.

Figure 12:
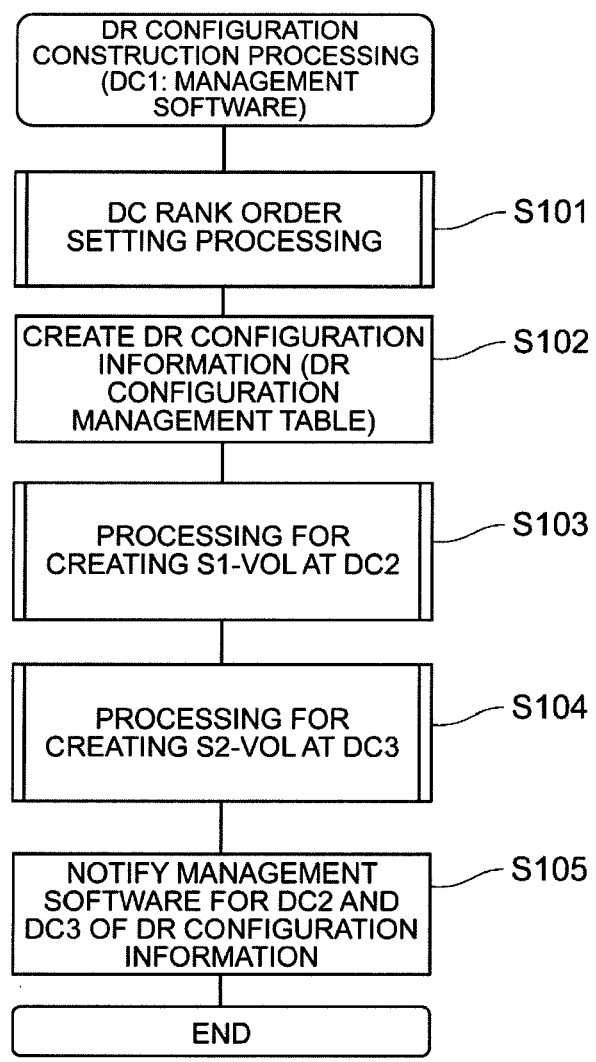
FIG. 12 is a flowchart illustrating disaster recovery configuration construction processing according to the embodiment.

As shown in FIG. 12, the management software program 110 executes DC rank order setting processing for setting the rank order of the data centers (DC2 and DC3) other than DC1 (S101). The DC rank order setting processing is processing for deciding where to locate the full copy secondary volume (S1-Vol) and the partial copy secondary volume (S2-Vol) of the primary volume.

Figure 13:
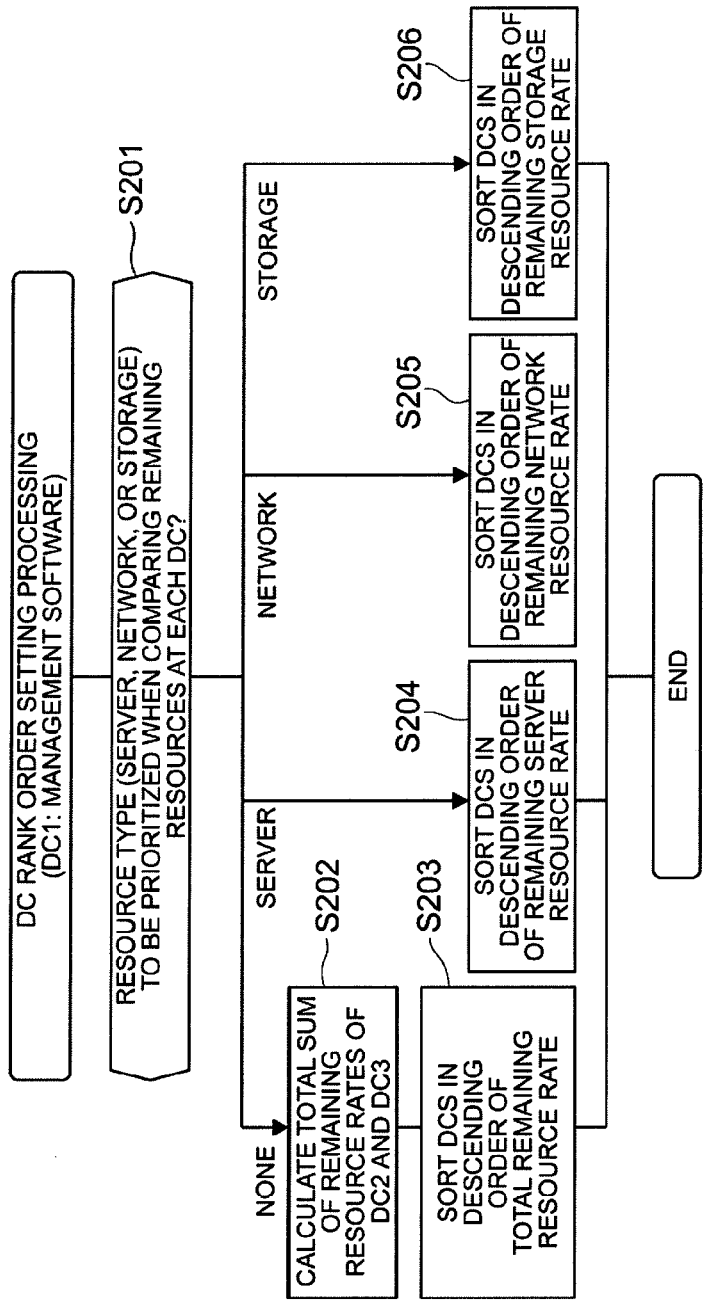
FIG. 13 is a flowchart illustrating the disaster recovery configuration construction processing according to the embodiment.

During the DC rank order setting processing as shown in FIG. 13, the management software program 110 refers to the policy management table 405 and judges which resource type should be prioritized when comparing the remaining resources at each data center (S201). Specifically speaking, the management software program 110 refers to a DR configuration entry in the policy management table 405 and checks to which resource type the flag is set.

If it is determined in step S201 that no flag is set to any of the resource types, the management software program 110 refers to the DC resource management table 402 and calculates a sum of the remaining resources of DC2 and DC3 (S202), calculates a remaining total resource rate, and sorts the data centers in descending order of the remaining resource rate (S203).

The remaining total resource rate calculated in step S203 is calculated by dividing the remaining resource amount of each data center by a required resource amount demanded by the active application. For example, assuming that the server resource amount is 100, the network resource amount is 100, and the storage resource amount is 100 with respect to the resource amount demanded by the application AP1 in the AP performance requirement management table 401, and also the remaining server resource amount is 160, the remaining network resource amount is 170, the remaining storage resource amount is 260 with respect to the remaining source amount of DC2, and the remaining server resource amount is 80, the remaining network resource amount is 90, and the remaining storage resource amount is 220 with respect to the remaining resource amount of DC3 in the DC resource management table 402, the remaining resource amount rates of DC2 and DC3 are found according to the following mathematical formulas.

[Math. 1]

$$\text{(Total Remaining Resource Amount Rate of DC2)} = (160/100)+(170/100)+(260/200)=4.6 \quad (1)$$

[Math. 2]

$$\text{(Total Remaining Resource Amount Rate of DC3)} = (80/100)+(90/100)+(220/200)=2.5 \quad (2)$$

Since Mathematical Formula (1) and Mathematical Formula (2) indicate that the data center with a larger total resource amount rate is DC2, the data centers are sorted in the order of DC2 and DC3 in step S203.

Furthermore, if it is determined in step S201 that the flag is set to the server, the management software program 110 calculates the remaining server resource amount rate in the same manner as in step S203 and sorts the data centers in descending order of the remaining resource rate (S204).

Furthermore, if it is determined in step S201 that the flag is set to the network, the management software program 110 calculates the remaining network resource amount rate in the same manner as in step S203 and sorts the data centers in descending order of the remaining resource rate (S205).

Furthermore, if it is determined in step S201 that the flag is set to the network, the management software program 110 calculates the remaining network resource amount rate in the same manner as in step S203 and sorts the data centers in descending order of the remaining resource rate (S206).

Incidentally, if the flag is set to, for example, the server and the network in the policy management table 405, the management software program 110 calculates a sum of the remaining server resource amount and the remaining network resource amount and calculates the resource amount rate in the same manner as in step S203.

Referring back to FIG. 12, the management software program 110 sets the DC rank order in step S101 and then creates disaster recovery configuration (DR configuration) information of the three data centers (S102). Specifically speaking, the management software program 1110 sets the location to place the first secondary volume (S1-Vol) as DC2 and the location to place the second secondary volume (S2-Vol) as DC3 to the DR configuration management table 404.

Subsequently, the management software program 110 creates S1-Vol at DC2 (S103) and creates S1-Vol at DC3 (S104). Then, the management software program 110 reports the DR configuration information stored in the DR configuration management table 404 created by the above-described processing to DC2 and DC3 (S105).

Now, the processing for creating the full copy secondary volume S1-Vol in step S103 and the partial copy secondary volume S2-Vol in step S104 will be explained with reference to FIG. 14 and FIG. 15.

Figure 14:
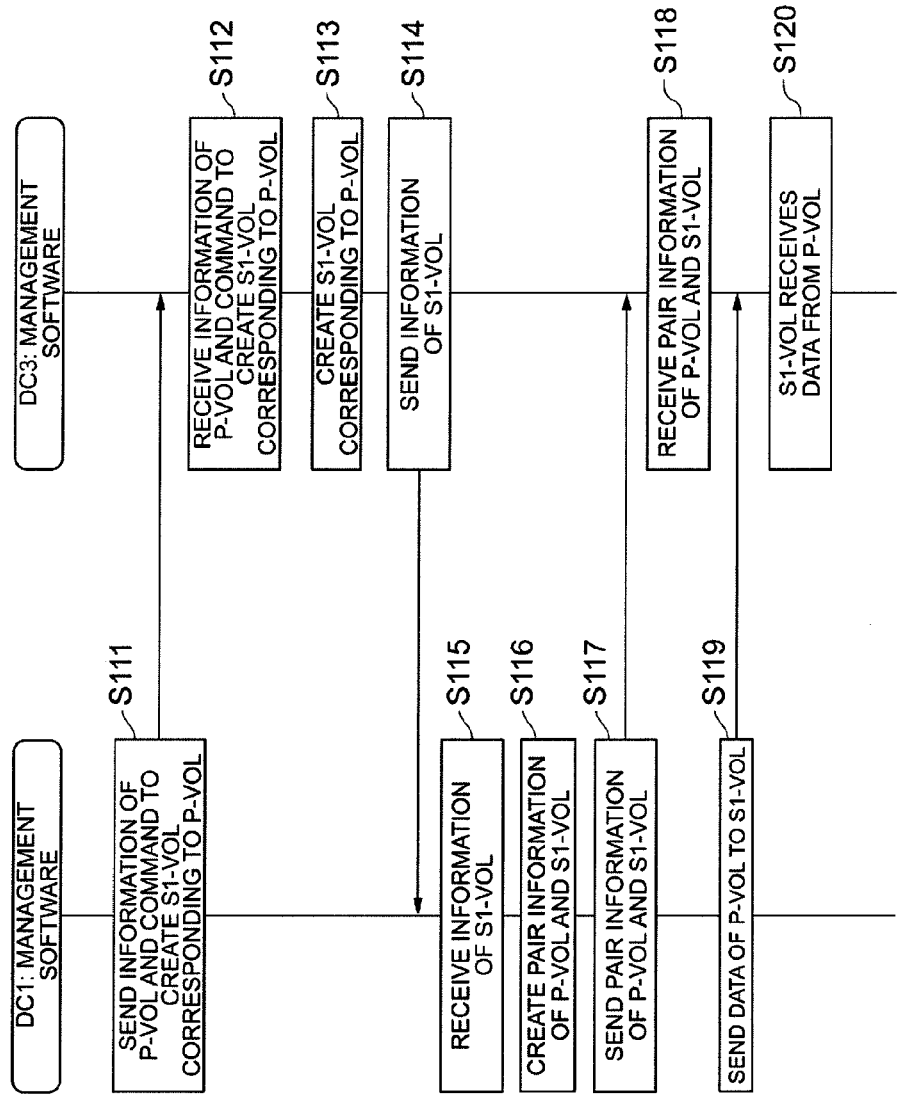
FIG. 14 is a flowchart illustrating the disaster recovery configuration construction processing according to the embodiment.

As shown in FIG. 14, the management software 110 for DC1 sends information of the primary volume (P-Vol) and a command to create the first secondary volume (S1-Vol) corresponding to the primary volume (P-Vol) to the management software 110 for DC2 (S111).

After receiving the information of the primary volume and the command to create the first secondary volume (S1-Vol) corresponding to the primary volume (P-Vol) from DC1 (S112), the management software 110 for DC2 creates the first secondary volume (S1-Vol) corresponding to the primary volume (P-Vol) (S113).

Subsequently, the management software 110 for DC2 sends the information of the first secondary volume (S1-Vol) created in step S113 to the management software 110 for DC1 (S114).

The management software 110 for DC1, which received the information of the first secondary volume (S1-Vol) from the management software 110 for DC2 in step S114, creates pair information about the primary volume (P-Vol) and the first secondary volume (S1-Vol) (S116) and sends that pair information to the management software 110 for DC2 (S117). Then, the management software 110 for DC2 receives the pair information from the management software 110 for DC1 (S118).

Then, the management software 110 for DC1 sends data of the primary volume (P-Vol) to the first secondary volume (S1-Vol) (S119). Then, the management software 110 for DC2 receives the data of the primary volume (P-Vol), which was sent in step S119, and stores it in the first secondary volume (S1-Vol) (S120).

Figure 15:
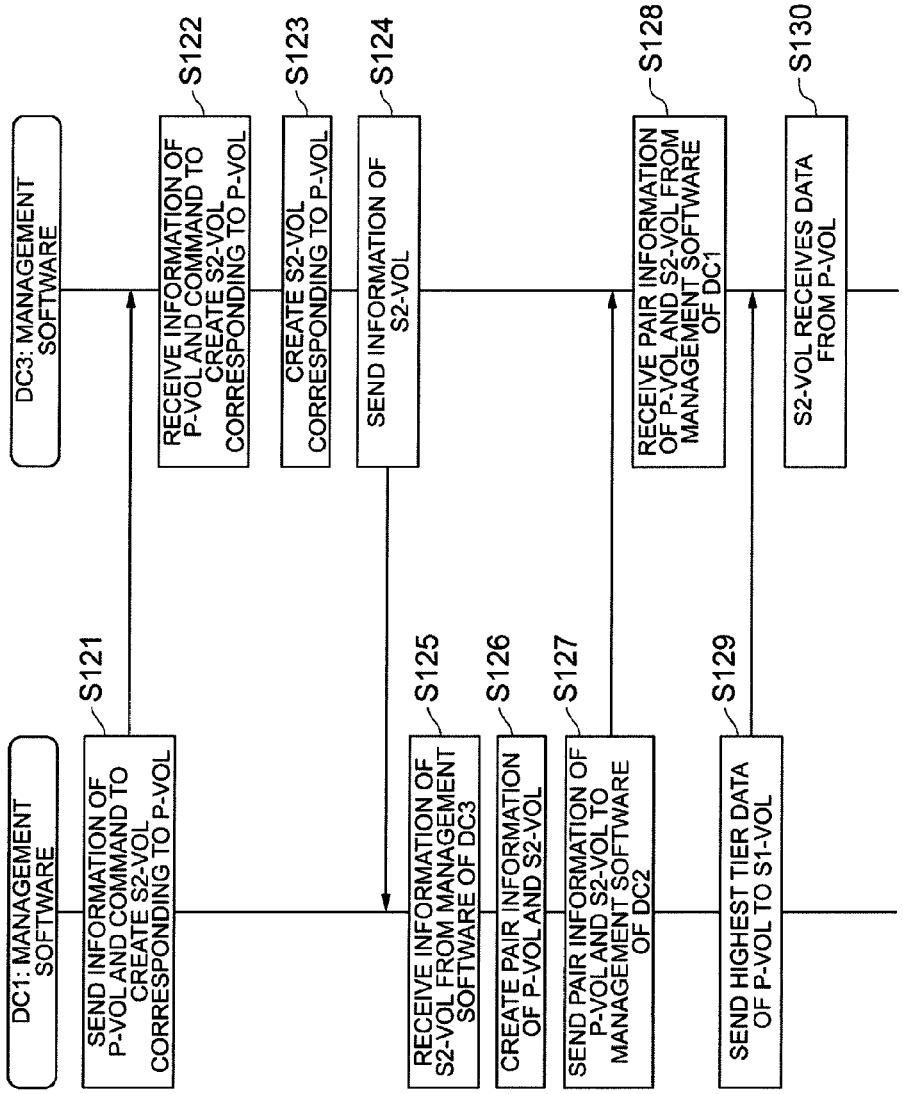
FIG. 15 is a flowchart illustrating the disaster recovery configuration construction processing according to the embodiment.

As shown in FIG. 15, the management software 110 for DC1 sends the information of the primary volume (P-Vol) and a command to create the second secondary volume (S2-Vol) corresponding to the primary volume (P-Vol) to the management software 110 for DC3 (S121). In step S121, the information of the primary volume (P-Vol) also includes tier information.

After receiving the information of the primary volume and the command to create the second secondary volume (S2-Vol) corresponding to the primary volume (P-Vol) from DC1 (S122), the management software 110 for DC3 creates the second secondary volume (S2-Vol) corresponding to the primary volume (P-Vol) (S123).

Subsequently, the management software 110 for DC3 sends information of the second secondary volume (S2-Vol) created in step S133 to the management software 110 for DC1 (S124).

The management software 110 for DC1, which received the information of the second secondary volume (S2-Vol) from the management software 110 for DC3 in step S124, creates pair information about the primary volume (P-Vol) and the second secondary volume (S2-Vol) (S126) and sends that pair information to the management software 110 for DC3 (S127). The pair information sent in step S127 also includes information indicating that the second secondary volume (S2-Vol) is a partial copy.

Then, the management software 110 for DC3 receives the pair information from the management software 110 for DC1 (S128).

Then, the management software 110 for DC1 sends the data of the primary volume (P-Vol) to the first secondary volume (S1-Vol) (S129). Then, the management software 110 for DC2 receives the data of the primary volume (P-Vol), which was sent in step S119, and stores it in the first secondary volume (S1-Vol) (S130).

(1-4-2) Data Update Processing in Disaster Recovery Configuration

Next, the data update processing in the disaster recovery configuration will be explained with reference to FIG. 16 to FIG. 20. The data update processing explained below is executed at the time of data write processing or migration processing between storage tiers.

Figure 16:
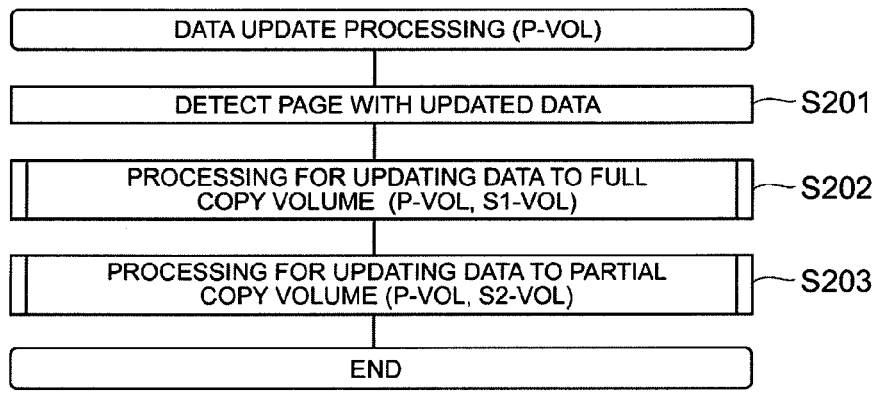
FIG. 16 is a flowchart illustrating data update processing in a disaster recovery configuration according to the embodiment.

As shown in FIG. 16, the storage program product 138 for DC1 firstly detects pages where data has been updated (S201). Subsequently, the storage program product 138 for DC1 notifies DC2 and DC3 that it has detected the pages where the data was updated; and then executes processing for updating the data to the full copy volume (S202) and processing for updating the data to the partial copy volume (S203).

Figure 17:
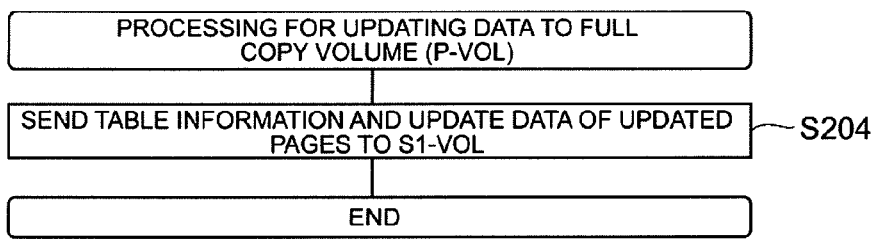
FIG. 17 is a flowchart illustrating the data update processing in the disaster recovery configuration according to the embodiment.

As shown in FIG. 17, the storage program product 138 for DC1 sends table information and update data of the updated pages to the first secondary volume (S1-Vol) (S204).

Figure 18:
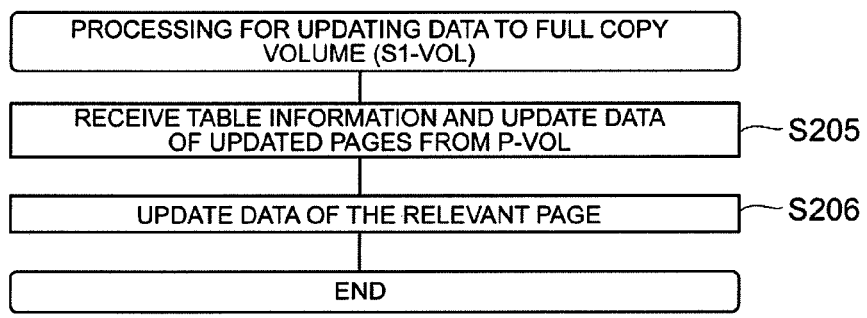
FIG. 18 is a flowchart illustrating the data update processing in the disaster recovery configuration according to the embodiment.

Then, as shown in FIG. 18, the storage program product 138 for DC2 receives the table information and the update data of the updated pages (S205) and updates the data of the relevant pages in the first secondary volume (S1-Vol) (S206).

Figure 19:
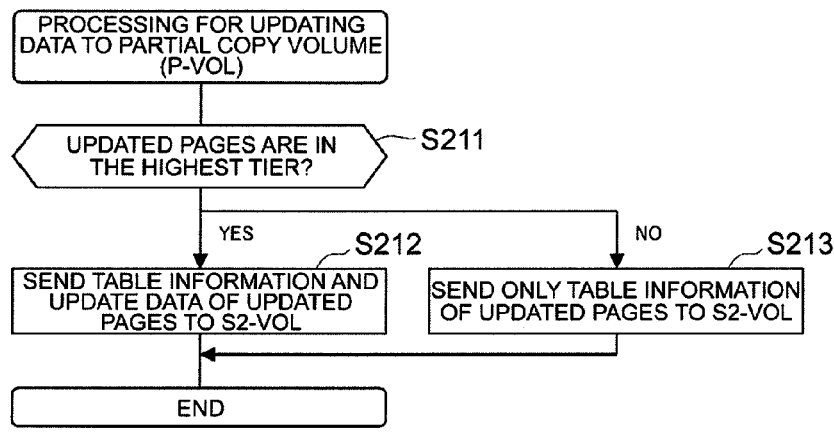
FIG. 19 is a flowchart illustrating the data update processing in the disaster recovery configuration according to the embodiment.

Next, as shown in FIG. 19, the storage program product 138 for DC1 judges whether the updated pages are in the highest tier or not (S211). Specifically speaking, the storage program product 138 refers to the intra-volume data arrangement management tables 406A and 406B and checks the tier of the updated pages.

If it is determined in step S211 that the updated pages are in the highest tier, the storage program product 138 for DC1 sends the table information and the update data of the updated pages to the second secondary volume (S2-Vol) (S212). On the other hand, if it is determined in step S211 that the updated pages are not in the highest tier, the storage program product 138 for DC1 sends only the table information of the updated pages to the second secondary volume (S2-Vol) (S213).

Figure 20:
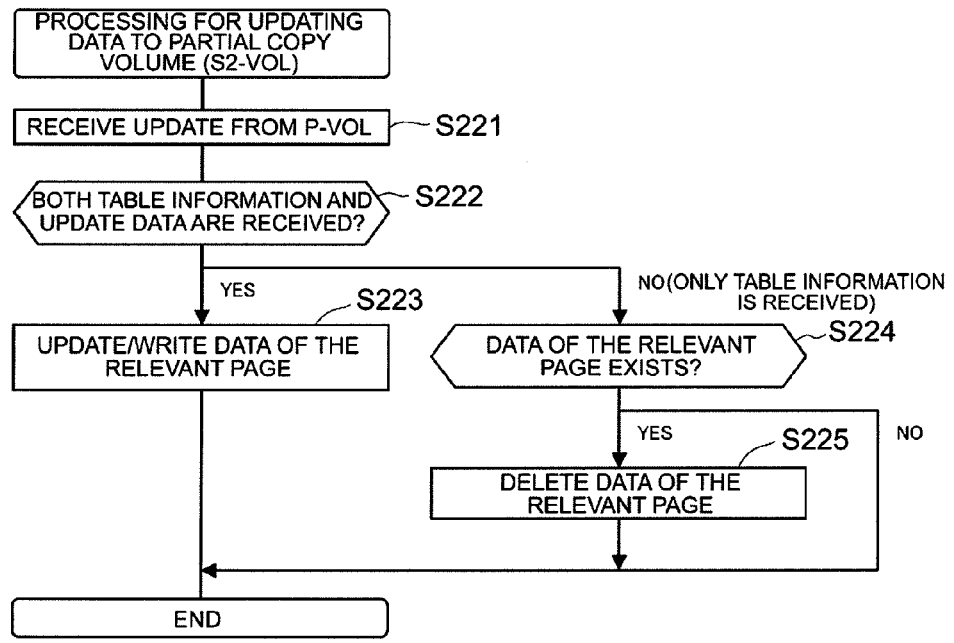
FIG. 20 is a flowchart illustrating the data update processing in the disaster recovery configuration according to the embodiment.

Then, as shown in FIG. 20, the storage program product 138 for DC3 receives the update information of the primary volume (P-Vol) from DC1 (S221). Then, the storage program product 138 for DC3 judges whether it has received both the table information and the update data in step S221 (S222).

If it is determined in step S222 that both the table information and the update data were received, the storage program product 138 for DC3 updates or writes the data to the relevant page (S223).

On the other hand, if it is determined in step S222 that only the table information was received, the storage program product 138 for DC3 judges whether the data of the relevant page exists or not (S224). If it is determined in step S224 that the data of the relevant page exists, the storage program product 138 for DC3 deletes the data of the relevant page (S225). On the other hand, if it is determined in step S224 that the data of the relevant page does not exist, the storage program product 138 for DC3 terminates the data update processing.

The case where the data of the relevant page is deleted in step S225 is, for example, a case where data located in the highest tier Tier 1 is no longer located in the highest tier because of, for example, the migration processing and the relevant data is deleted. Since only data located in the highest tier among data of the primary data is copied to the second secondary volume, the data located in tiers other than the highest tier will be deleted.

Wasteful use of the resources such as bandwidth, processors, and volume capacity required for data transfer at the time of construction of the disaster recovery system is prevented by storing a full copy in a volume at DC2 and a partial copy in a volume at DC3 as described above.

(1-4-3) Failover Processing

Next, failover processing will be explained with reference to FIG. 21 to FIG. 25. If DC1 which is a main site experiences a disaster, failover processing is processing for deciding a data center, which should be a failover location of the applications, and continuing the execution of the applications at that data center. The failover processing by the management software program 110 of the management server 11 for DC2 which is a master management server of the failover location will be explained below.

Figure 21:
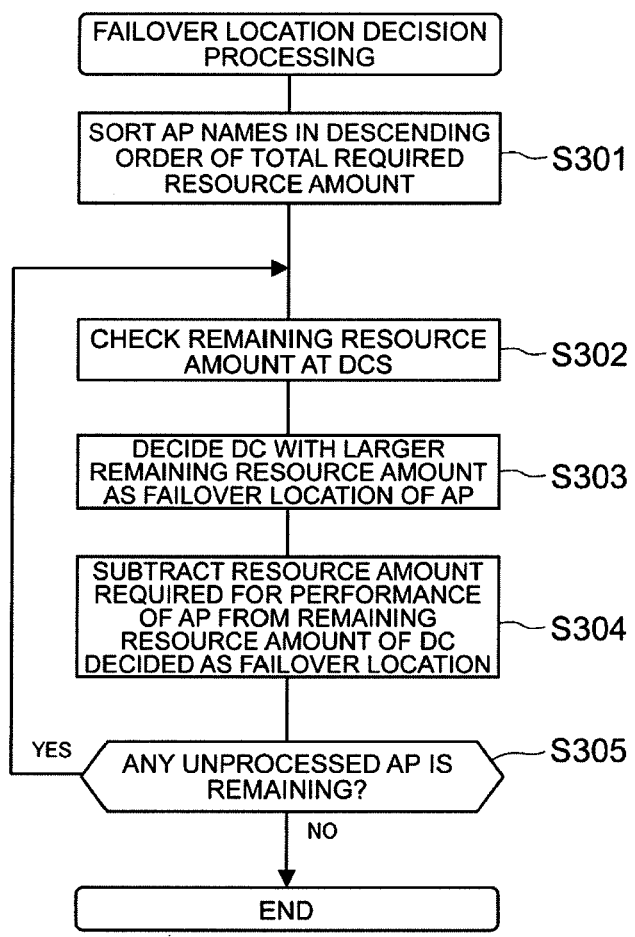
FIG. 21 is a flowchart illustrating failover processing according to the embodiment.

Firstly, processing for deciding the failover location of the applications will be explained below with reference to FIG. 21. As shown in FIG. 21, the management software program 110 for DC2 firstly calculates a total required resource amount in the AP performance requirement management table 401 with respect to the resource(s), to which the flag is set to a failover entry in the policy management table 405, and sorts the application names in descending order of the total required resource amount (S301).

Specifically speaking, if the flag is set to the server and the network in the policy management table 405, the failover location is decided based on the server and network required resource amount. Specifically speaking, assuming that the server and network required resource amount of the application AP1 is 100+100=200 and the server and network resource amount of the application AP2 is 50+50=100 in the AP performance requirement management table 401, the application names are sorted in descending order of the total resource amount, that is, in the order of AP1 and AP2.

Then, the management software program 110 for DC2 refers to the DC resource management table 402 and checks the remaining resource amount of the data centers (DC2 and DC3) which are the failover locations (S302).

Then, the management software program 110 for DC2 decides the data center with a larger remaining resource amount as the failover location of the applications (S303). Then, the management software program 110 for DC2 subtracts a resource amount required for the applications from the remaining resource amount of the data center decided as the failover location (S304).

For example, assuming that the remaining server resource amount is 160 and the remaining network resource amount is 170 with respect to DC2 and the remaining server resource amount is 80 and the remaining network resource amount is 90 with respect to DC3 in the DC resource management table 402, the total remaining resource amount of DC2 is larger than that of DC3 in step S303, DC2 is decided as the failover location of AP1.

Then, assuming that the server resource amount is 100 and the network resource amount is 100 with respect to the resource amount required for the application AP1, the remaining server resource amount becomes 60 and the remaining network resource amount becomes 70 with respect to DC2 and the remaining server resource amount becomes 80 and the remaining network resource amount becomes 90 with respect to DC3 as a result of the calculation in step S304. In other words, after the failover location of the application AP1 is decided, the total remaining resource amount of DC3 becomes larger than that of DC2.

Subsequently, the management software program 110 for DC2 judges whether any unprocessed application (AP) is remaining or not (S305). The unprocessed application means an application for which the failover location has not been decided. If it is determined in step S305 that an unprocessed application is remaining, the management software program 110 for DC2 repeats the processing in step S302 and subsequent steps on the relevant application. On the other hand, if it is determined in step S305 that no unprocessed application is remaining, the management software program 110 for DC2 terminates the processing.

Next, application failover processing will be explained. Firstly, processing for restoring the application at DC2 having the first secondary volume (S1-Vol) which is the full copy will be explained.

Figure 22:
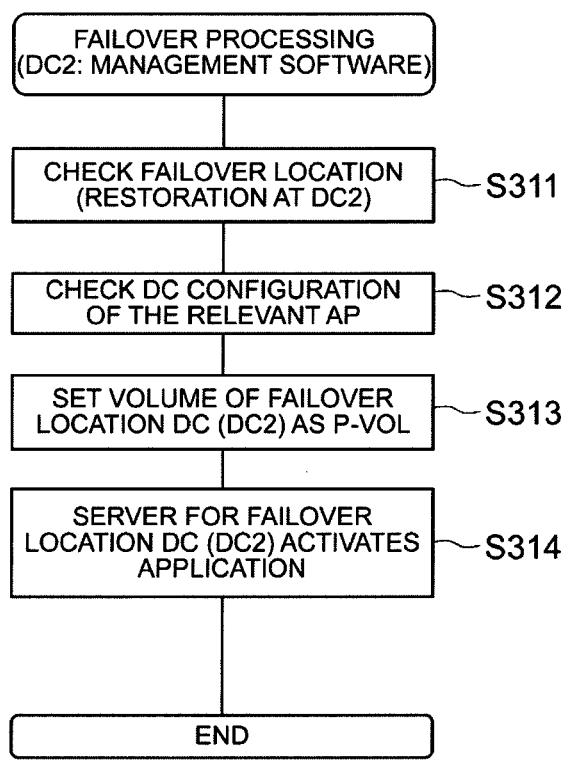
FIG. 22 is a flowchart illustrating the failover processing according to the embodiment.

As shown in FIG. 22, the management software program 110 for DC2 firstly checks the failover location (DC2) of the application (S311). Then, the management software program 110 for DC2 checks the DC configuration of the relevant application AP (S312). Specifically speaking, the management software program 110 for DC2 refers to the DR configuration management table 404 and checks, for example, the volume configuration of the location where the relevant application is located.

Then, the management software program 110 for DC2 sets a volume at DC2, which is the failover location, as a primary volume (P-Vol) (S313). Specifically speaking, the management software program 110 for DC2 sets the first secondary volume (S1-Vol) in the DR configuration management table 404 as the primary volume (P-Vol).

Then, the management software program 110 for DC2 has the server for the failover location DC2 activate the relevant application (S314).

Next, processing for restoring the application at DC3 having the second secondary volume (S2-Vol) which is the partial copy will be explained.

Figure 23:
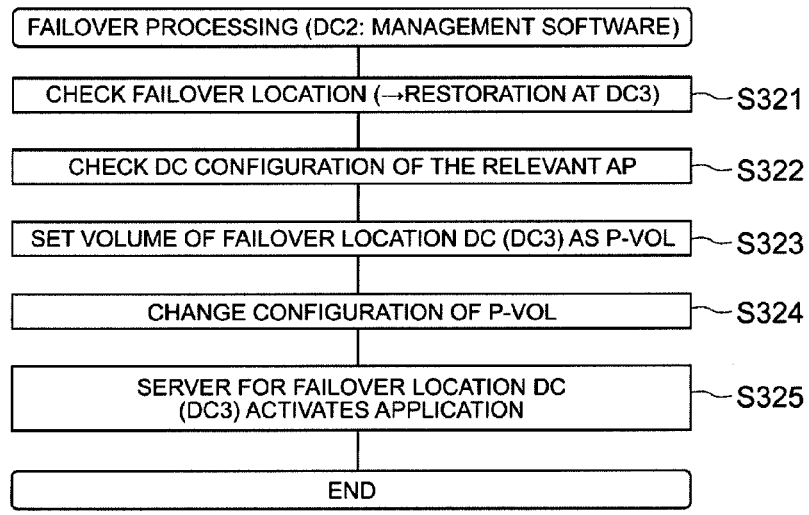
FIG. 23 is a flowchart illustrating the failover processing according to the embodiment.

As shown in FIG. 23, the management software program 110 for DC2 firstly checks the failover location (DC3) of the application (S321). Then, the management software program 110 for DC2 checks the DC configuration of the relevant application AP (S322). Specifically speaking, the management software program 110 for DC2 refers to the DR configuration management table 404 and checks, for example, the volume configuration of the location where the relevant application is located.

Then, the management software program 110 for DC2 sets a volume of DC3, which is the failover location, as a primary volume (P-Vol) (S323). Specifically speaking, the management software program 110 for DC2 sets the second secondary volume (S2-Vol) in the DR configuration management table 404 as the primary volume (P-Vol).

Then, the management software program 110 for DC2 changes the configuration of the primary volume P-Vol (S324). Specifically speaking, the management software program 110 for DC2 sets Tier 1 in the primary volume (P-Vol) to a drive for Tier 1 of DC3 and associates Tier 2 and lower tiers with drives for Tier 2 and lower tiers of DC2.

Then, the management software program 110 for DC2 has the server for DC3, which is the failover location, activate the relevant application (S325).

Next, processing for copying data of Tier 2 and lower tiers to the primary volume (P-Vol) after the failover of the application where the failover location is DC3 will be explained.

Figure 24:
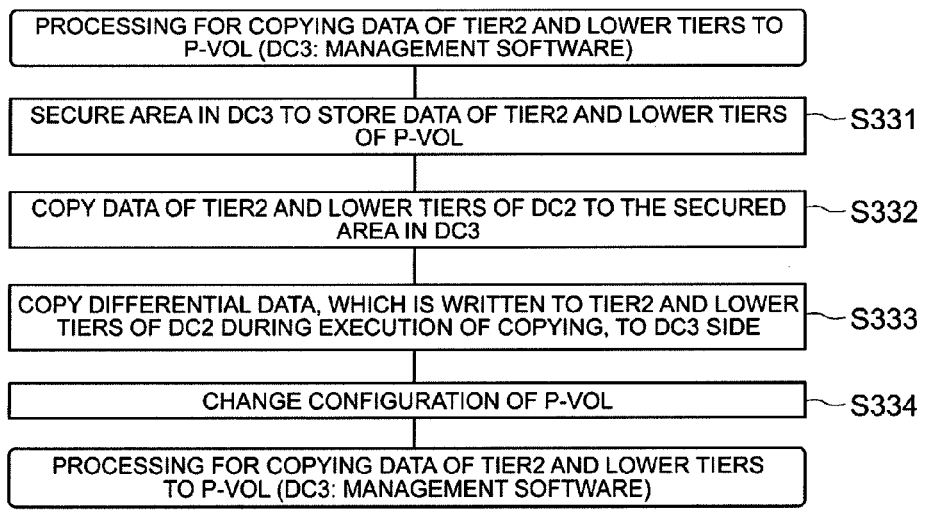
FIG. 24 is a flowchart illustrating the failover processing according to the embodiment.

As shown in FIG. 24, the management software program 110 for DC3 secures an area for storing data in Tier 2 and lower tiers of the primary volume P-Vol, in the storage apparatus 13 for DC3 (S331). Then, the management software program 110 for DC3 copies data of Tier 2 and lower tiers, which is stored in the storage apparatus 13 for DC2, to the area secured in the storage apparatus 13 for DC3 (S332).

During the execution of data copying in step S332, the management software program 110 for DC3 copies differential data, which has been written to Tier 2 and lower tiers of DC2, to the storage apparatus 13 for DC3 (S333). Then, the management software program 110 for DC3 changes the configuration of the primary volume (P-Vol) (S334). Specifically speaking, the management software program 110 for DC3 associates all the tiers of the primary volume (P-Vol) with the drive for DC3.

Next, data access processing in a case where data of Tier 1 and Tier 2 and lower tiers are stored in volumes of different data centers will be explained. For example, if the failover is performed by setting the partial copy volume of the storage apparatus 13 for DC3 as the primary volume (P-Vol) and then a read request is issued to the primary volume (P-Vol), this processing is executed. The data center (DC3) where data of the partial copy is stored has information indicating that data of Tier 2 and lower tiers is stored in another data center (DC2).

Figure 25:
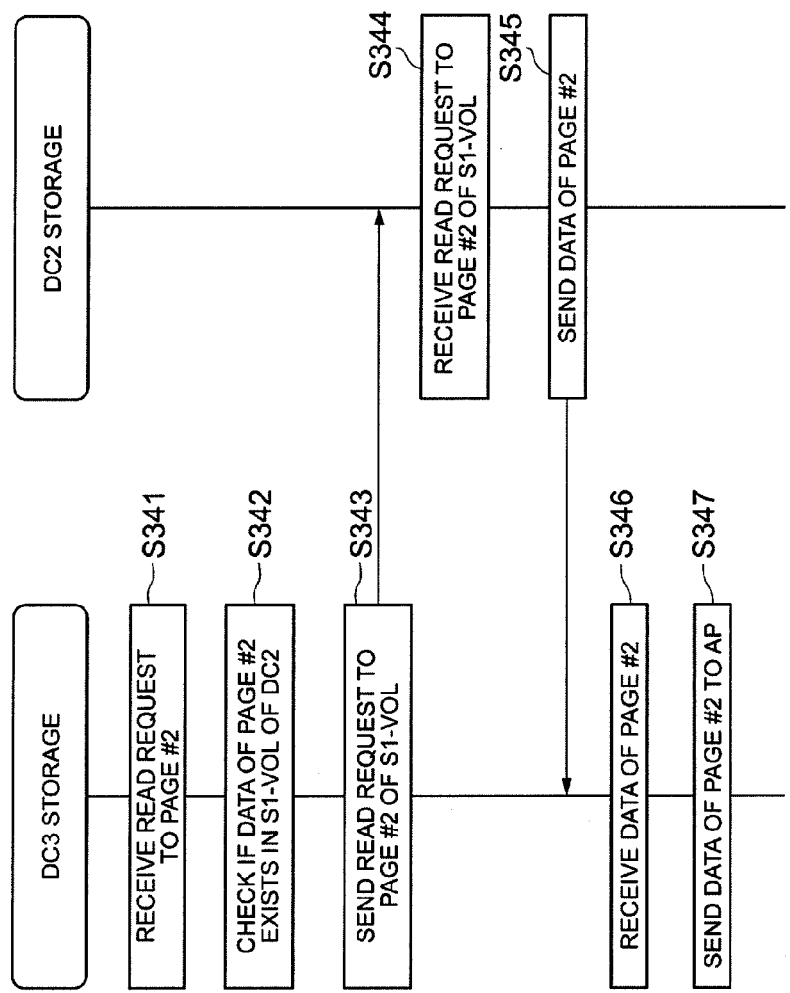
FIG. 25 is a flowchart illustrating failover processing according to the embodiment.

As shown in FIG. 25, the storage apparatus 13 for DC3 firstly receives a read request to page #2 (S341). Then, the storage apparatus 13 for DC3 checks if data of page #2 exists in S1-Vol of DC2 (S342). Then, the storage apparatus 13 for DC3 sends the read request to page #2 of S1-Vol (S343).

After receiving the read request to page #2 of S1-Vol from the storage apparatus 13 for DC3 (S344), the storage apparatus 13 for DC2 obtains data of page #2 of its own volume and sends it to the storage apparatus 13 for DC3 (S345).

The storage apparatus 13 for DC3 receives the data of page #2 from the storage apparatus 13 for DC2 and sends the data of page #2 to the application (S347).

In this way, the load bias after the failover can be minimized by deciding the failover location according to the status of the unused resource amount.

(1-4-4) Migration Processing

Next, migration processing will be explained with reference to FIG. 26 to FIG. 31. The migration processing described below is processing for migrating some of the applications to another data center before the resource becomes deficient when the resource deficiency at the data center is predicted along with changes of the application operation status. The following migration processing is executed by the management software program 110 of each data center individually or in cooperation with each other.

Figure 26:
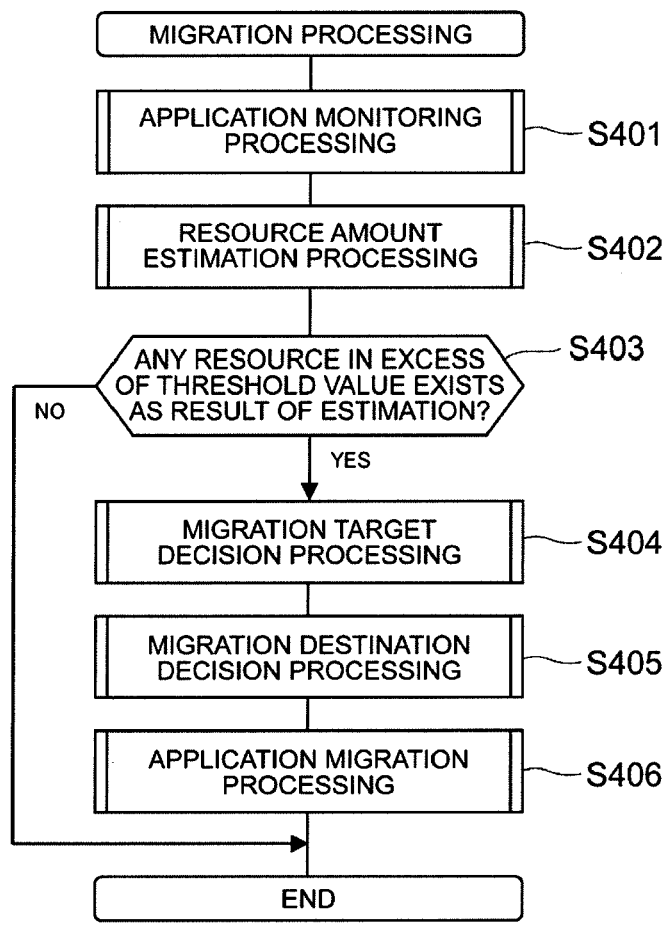
FIG. 26 is a flowchart illustrating migration processing according to the embodiment.

As shown in FIG. 26, the management software program 110 executes application monitoring processing (S401) and executes the resource amount estimation processing (S402).

Figure 27:
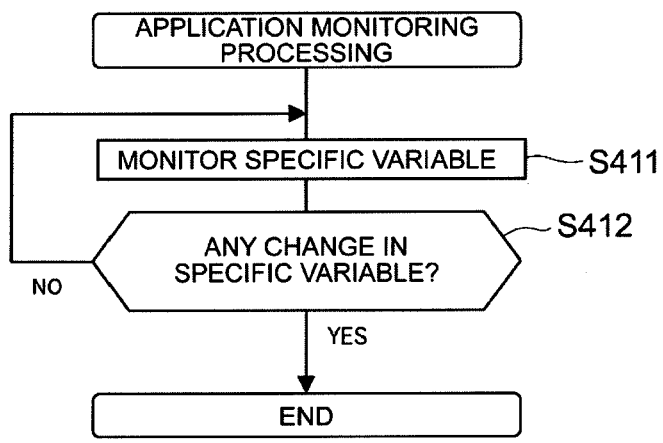
FIG. 27 is a flowchart illustrating the migration processing according to the embodiment.

The details of the application monitoring processing will be explained with reference to FIG. 27. The management software program 110 monitors a specific variable (S411). The specific variable means, for example, the number of users who use a virtual desktop environment.

Then, the management software program 110 judges whether or not there is any change in the variable monitored in step S411 (S412). If it is determined in step S412 that there is a change in the specific variable, the management software program 110 executes the resource amount estimation processing (S402). On the other hand, if it is determined in step S412 that there is no change in the specific variable, the management software program 110 repeats processing in step S411 and subsequent steps.

Figure 28:
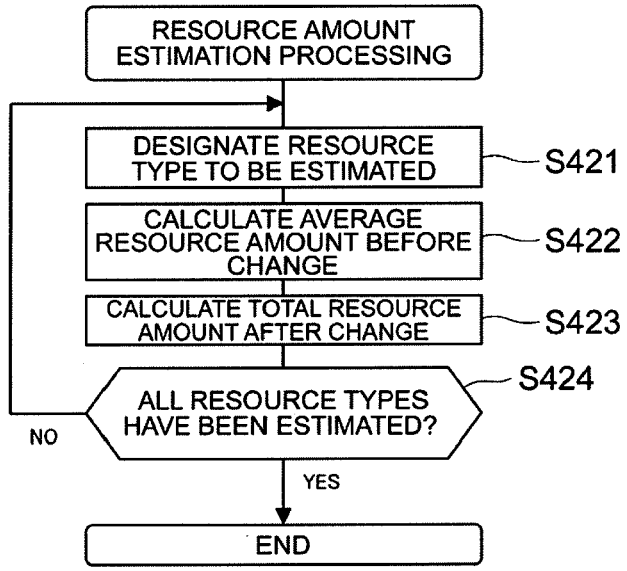
FIG. 28 is a flowchart illustrating the migration processing according to the embodiment.

Subsequently, the details of the resource amount estimation processing will be explained with reference to FIG. 28. The management software program 110 designates the resource type to be estimated (S421). For example, the management software program 110 designates the resource type such as the server, the network, or the storage.

Then, the management software program 110 calculates an average resource amount before the change (S422) and estimates an average resource amount after the change (S423). The average resource amount before the change in step S422 can be calculated by, for example, dividing the total resource amount before the change by the number of users before the change. Furthermore, the total resource amount after the change in step S423 can be calculated by multiplying the average resource amount before the change by the number of users after the change. The total resource amount after the change which is calculated in step S423 is the resource amount after the change, which is predicted by using the resource amount before the change when the specific variable (the number of users) changes.

Returning to FIG. 26, the management software program 110 judges whether or not there is any resource in excess of a specified threshold value as a result of the estimation of the resource amount in step S402 (S403). If it is determined in step S403 that the resource in excess of the specified threshold value exists, the management software program 110 executes processing in step S404 and subsequent steps. On the other hand, if it is determined in step S403 that the resource in excess of the specified threshold value does not exist, the management software program 110 terminates the migration processing.

Figure 29:
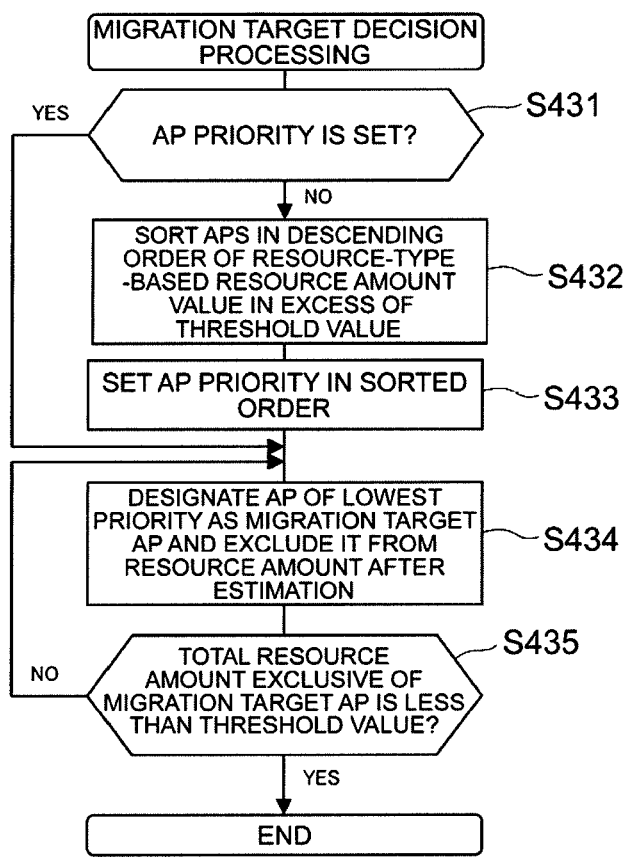
FIG. 29 is a flowchart illustrating the migration processing according to the embodiment.

In step S404, the management software program 110 executes processing for deciding a migration destination. In the following explanation, a case where the server resource amount exceeds the threshold value will be explained. The details of the migration target decision processing will be explained with reference to FIG. 29. As shown in FIG. 29, the management software program 110 judges whether application priority is set or not (S431). Regarding the application priority, the priority may be set in descending order of the required resource amount or the priority may be set by the system administrator in advance.

If it is determined in step S431 that the application priority is set, the management software program 110 executes processing in step S434 and subsequent steps. On the other hand, if it is determined in step S431 that the application priority is not set, the management software program 110 sorts the applications in descending order of the resource-type-based resource amount in excess of the specified threshold value (S432). Then, the management software program 110 sets the application priority in the order sorted in step S432 (S433).

Then, the management software program 110 designates an application of the lowest priority as a migration target application and excludes a resource amount required by the relevant application from the server resource amount estimated in step S423 (S434).

Then, the management software program 110 judges whether or not the total resource amount, excluding the migration target application in step S323, is less than a specified threshold value (S435).

If it is determined in step S435 that the total resource amount is less than the specified threshold value, the management software program 110 terminates the processing. On the other hand, if it is determined in step S435 that the total resource amount is not less than the specified threshold value, the management software program 110 repeats the processing in step S434 until the total resource amount falls under the specified threshold value.

Figure 30:
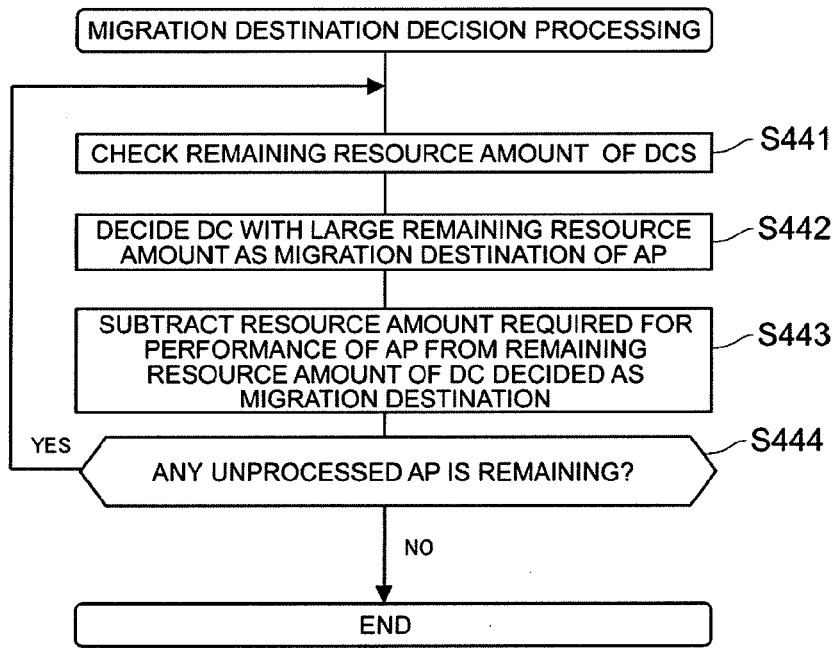
FIG. 30 is a flowchart illustrating the migration processing according to the embodiment.

Next, the details of migration destination decision processing will be explained with reference to FIG. 30. As shown in FIG. 30, the management software program 110 checks the remaining resource amount of the data centers (S441). Then, the management software program 110 decides the data center with a large remaining resource amount as a migration destination of the application AP (S442).

When checking the remaining resource amount in step S441, the management software program 110 subtracts a resource amount required for the performance of the application AP from the remaining resource amount of the data center whose remaining resource amount is large (S443).

Subsequently, the management software program 110 judges whether any unprocessed application on which the migration destination decision processing has not been executed is remaining (S444). If it is determined in step S444 that an unprocessed application(s) is remaining, the management software program 110 repeats the processing in step S441 and subsequent steps. On the other hand, if it is determined in step S444 that no unprocessed application is remaining, the management software program 110 terminates the processing.

Subsequently, the details of application migration processing will be explained with reference to FIG. 31. The management software program 110 migrates an application for which the migration destination data center was decided as a result of the above-described processing.

Figure 31:
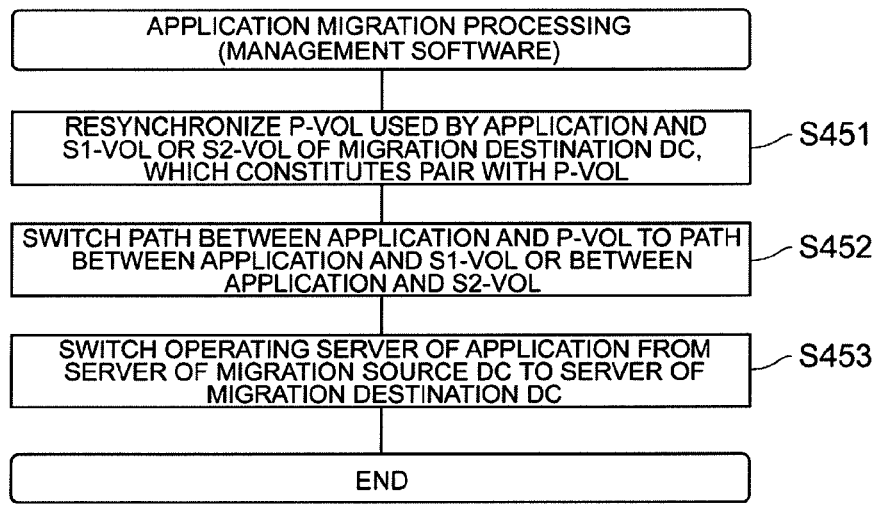
FIG. 31 is a flowchart illustrating the migration processing according to the embodiment.

As shown in FIG. 31, the management software program 110 re-synchronizes the primary volume P-Vol used by the application with the first secondary volume S1-Vol or the second secondary volume S2-Vol, which constitutes a pair with the primary volume P-Vol and is the volume of the migration destination data center (S451). As a result of the re-synchronization processing in step S451, the state without any data difference due to, for example, updates is realized.

Then, the management software program 110 switches a path between the application and the primary volume P-Vol to a path between the application and the first secondary volume S1-Vol or the second secondary volume S2-Vol (S452).

Then, the management software program 110 switches an operating server of the application from the business server 12 for the migration source data center to the business server 12 for the migration destination data center (453).

In this way, it is possible to migrate the application and distribute the load before an actual increase of the load by predicting the increase of the load at the data center.

(1-5) Advantageous Effects of this Embodiment

According to this embodiment as described above, the disaster recovery system is constructed from the first data center (DC1), the second data center (DC2), and the third data center (DC3); all pieces of data stored in the primary volume of the first data center are copied to the first secondary volume of the second data center; and part of the data stored in the primary volume of the first data center is copied to the second secondary volume. As a result, with the disaster recovery system constructed from three or more data centers, consumption of the resources such as bandwidths and CPUs required for data transfer and the storage area capacity can be cut down and the efficient disaster recovery system can be constructed by copying only part of the primary volume of the first data center to the second secondary volume of the third data center.

(2) Second Embodiment (2-1) Outline of this Embodiment

In this embodiment, a data center where the relevant application can be located is decided according to an accounting level that is set to the application. For example, an application of a high accounting level is located at a high-ranking data center and an application of a low accounting level is located at a low-ranking data center. In this embodiment, the high-ranking data center is the main site data center having the primary volume. Furthermore, the low-ranking data center is the data center having the second secondary volume which is the partial volume of the primary volume.

For example, if an application of low importance is located at the low-ranking data center by setting a low accounting level to the relevant application, the resource amount of the high-ranking data center increases. As a result, it becomes easy to secure the resources to operate an application of a high accounting level at the high-ranking data center.

(2-2) Configuration of Storage System

Since the configuration of the storage system according to this embodiment is almost the same as that of the first embodiment, the configuration different from that of the first embodiment will be explained below.

In this embodiment, a data center cost level management table 501 for managing the cost level of each data center and an application accounting level management table 502 for managing the accounting level of each application are further included as the management tables 114 stored in the integrated storage device 113 of the management server 11. The management software program 110 for the management server 11 refers to the data center cost level management table 501 and the application accounting level management table 502, decides the data center to be a copy destination of the application, and constructs the disaster recovery system from the three data centers (DC1, DC2, and DC3).

The data center cost level management table 501 is a table for managing the cost level that is set to each data center in advance; and is constituted from a DC name column 5011 and a cost level column 5012 as shown in FIG. 32.

The DC name column 5011 stores the name of the relevant data center. The cost level column 5012 stores a value indicating the cost level that is set to the data center in advance. For example, a high numerical value is set to the data center of a high cost level. The cost level of the data center is a value indicating the position of the data center in the disaster recovery system; and the possibility of the data center of a higher cost level to operate as the main site increases.

For example, cost level 3 is set to DC1, cost level 2 is set to DC2, and cost level 1 is set to DC3 in FIG. 32. It shows that the possibility to operate as the main site is high in descending order of the numerical value of the cost level.

The application accounting level management table 502 is a table for managing the accounting level that is set to each application; and is constituted from an AP name column 5011 and an accounting level column 5012 as shown in FIG. 33.

The AP name column 5011 stores the name of the relevant application. The accounting level column 5012 stores a value indicating the accounting level that is set to the application. For example, the application of a high accounting level is located at the data center whose cost level is high.

For example, accounting level 3 is set to the application AP1, accounting level 2 is set to the application AP2, and accounting level 1 is set to the application AP3 in FIG. 33; and it shows that data of the application AP1 and a full copy and partial copy of the relevant data are stored in the higher-ranking data center than the data center for the other application AP2 or AP3.

(2-3) Details of Each Processing

Processing different from that of the first embodiment will be explained below in detail and any detailed explanation has been omitted about the same processing as that of the first embodiment.

As described above, the difference between this embodiment and the first embodiment is that the disaster recovery system is constructed by referring to the cost level of the data centers and the accounting level of the applications.

(2-3-1) Disaster Recovery Configuration Construction Processing

Figure 34:
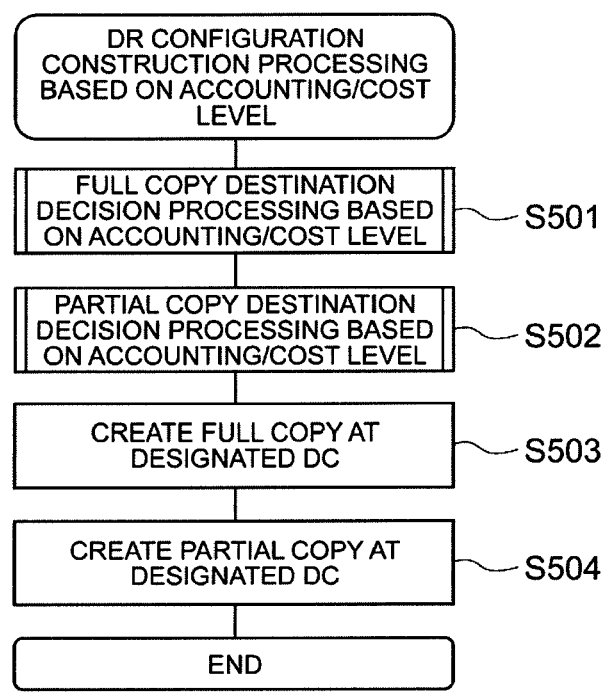
FIG. 34 is a flowchart illustrating disaster recovery configuration construction processing according to the embodiment.

As shown in FIG. 34, the management software program 110 for DC1 firstly decides a full copy destination of data based on the cost level of the data centers and the accounting level of the applications (S501).

Figure 35:
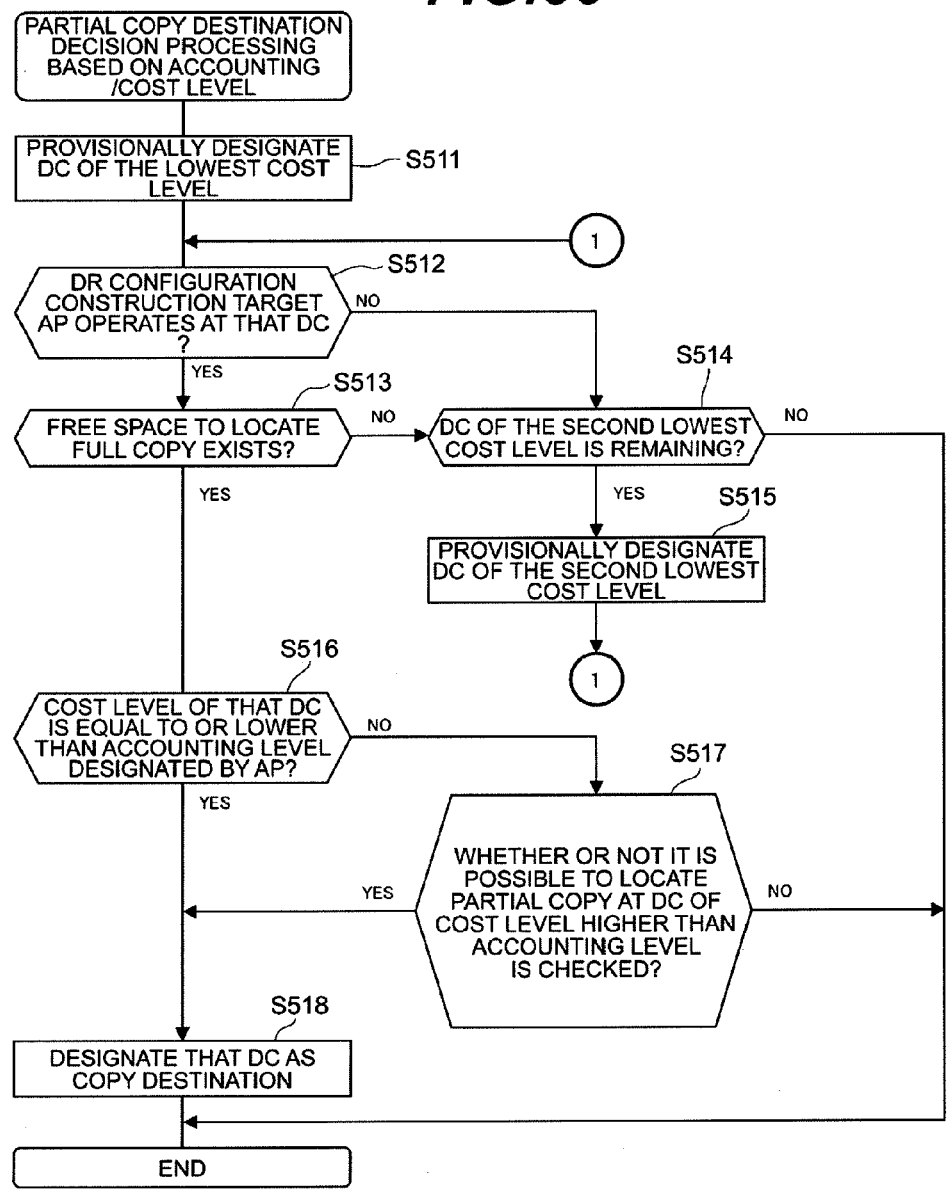
FIG. 35 is a flowchart illustrating full copy destination decision processing according to the embodiment.

FIG. 35 shows the details of the full copy destination decision processing in step S501. As shown in FIG. 35, the management software program 110 provisionally designates a data center of the lowest cost level (S511).

Then, the management software program 110 judges whether or not the target application for which the disaster recovery configuration is to be constructed operates at the data center designated in step S511 (S512). Specifically speaking, the management software program 110 judges whether the server resource amount of the data center for which the server resource amount required by the target application is designated is enough or not.

If it is determined in step S512 that the target application for which the disaster recovery configuration is to be constructed operates at the designated data center, the management software program 110 judges whether the relevant data center has the storage resource to locate the full copy or not (S513).

On the other hand, if it is determined in step S512 that the target application for which the disaster recovery configuration is to be constructed does not operate at the designated data center, the management software program 110 then judges whether or not the data center of the second lowest cost level is remaining (S514). Specifically speaking, if the data center of the cost level 3 is designated in step S512, the management software program 110 judges whether or not there is any data center of the cost level higher than the cost level 3.

If it is determined in step S513 that there is a free space to locate the full copy at the designated data center, the management software program 110 judges whether or not the cost level of the relevant data center is equal to or lower than the accounting level designated for the application (S516). For example, if the cost level of the designated data center is 1, the management software program 110 judges whether that cost level is equal to or lower than the accounting level designated for the application. If the accounting level of the application is 3 and the cost level of the data center is 1, the cost level of the data center is lower than the accounting level of the application.

On the other hand, if it is determined in step S513 that there is no free space to locate the full copy at the designated data center, the management software program 110 executes the above-described processing in step S514.

If it is determined in step S514 that a data center of the second lowest cost level is remaining, the management software program 110 provisionally designates that data center (S515) and repeats the processing in step S512 and subsequent steps. On the other hand, if it is determined in step S514 that the data center of the second lowest cost level is not remaining, the management software program 110 terminates the processing.

Furthermore, if it is determined in step S516 that the cost level of the provisionally designated data center is equal to or lower than the accounting level designated for the application, the management software program 110 designates that data center as a copy destination of the full copy of the data (S518).

On the other hand, if it is determined in step S516 that the cost level of the provisionally designated data center is not equal to or lower than the accounting level designated for the application, the management software program 110 judges whether or not the possibility to locate the full copy at the data center of the cost level higher than the accounting level has been checked with the user (S517). For example, if it is possible to operate the application only at the data center of the cost level higher than the accounting level, a screen to check whether the full copy may be located at the data center of the cost level higher than the accounting level of the application is displayed on a display screen of a user terminal.

The user checks the display screen and judges, with respect to the relevant application, whether or not it is necessary to locate the full copy at the data center of the cost level higher than that of the data center corresponding to the accounting level.

For example, if the target application is an application of high importance and the required resource amount increases due to, for example, an increase of the number of users, it is determined that it is necessary to locate the full copy at the data center even by increasing the accounting level of the application. Furthermore, if the importance of the target application is not so high, it is determined that it is unnecessary to locate the full copy at the data center even by increasing the accounting level of the application.

If it is determined in step S517 that the check with the user was performed, the management software program 110 decides the provisionally designated data center as the copy destination of the full copy (S518). On the other hand, if it is determined in step S517 that the check with the user was not performed, the management software program 110 terminates the processing.

Returning to FIG. 34, after the full copy destination was decided in step S501, the management software program 110 decides a partial copy destination based on the cost level of the data center and the accounting level of the application (S502).

FIG. 36 shows the details of the partial copy destination decision processing in step S502. As shown in FIG. 36, the management software program 110 provisionally designates a data center of the lowest cost level (S521).

Then, the management software program 110 judges whether or not the target application for which the disaster recovery configuration is to be constructed operates at the data center designated in step S521 (S522). Specifically speaking, the management software program 110 judges whether the server resource amount of the data center for which the server resource amount required by the target application is designated is enough or not.

If it is determined in step S522 that the target application for which the disaster recovery configuration is to be constructed operates at the designated data center, the management software program 110 judges whether the full copy of the target application exists at that data center or not (S523). If the full copy of the target application exists at the designated data center, it is necessary to store a partial copy at another data center.

On the other hand, if it is determined in step S522 that the target application for which the disaster recovery configuration is to be constructed does not operate at the designated data center, the management software program 110 then judges whether or not the data center of the second lowest cost level is remaining (S525). Specifically speaking, if the data center of the cost level 3 is designated in step S522, the management software program 110 judges whether or not there is any data center of the cost level higher than the cost level 3.

If it is determined in step S523 that the full copy of the target application does not exist at the designated data center, the management software program 110 judges whether or not the relevant data center has the storage resource to locate the partial copy (S524). On the other hand, if it is determined in step S523 that there is no free space to locate the full copy at the designated data center, the management software program 110 executes the above-described processing in step S525.

If it is determined in step S524 that there is a free space to locate the partial copy at the designated data center, the management software program 110 judges whether or not the cost level of the relevant data center is equal to or lower than the accounting level designated for the application (S527). For example, if the cost level of the designated data center is 1, the management software program 110 judges whether that cost level is equal to or lower than the accounting level designated for the application. If the accounting level of the application is 3 and the cost level of the data center is 1, the cost level of the data center is lower than the accounting level of the application.

On the other hand, if it is determined in step S524 that there is no free space to locate the partial copy at the designated data center, the management software program 110 executes the above-described processing in step S525.

If it is determined in step S525 that a data center of the second lowest cost level is remaining, the management software program 110 provisionally designates that data center (S526) and repeats the processing in step S522 and subsequent steps. On the other hand, if it is determined in step S525 that a data center of the second lowest cost level is not remaining, the management software program 110 terminates the processing.

Furthermore, if it is determined in step S527 that the cost level of the provisionally designated data center is equal to or lower than the accounting level designated for the application, the management software program 110 designates that data center as a copy destination of the partial copy of the data (S528).

On the other hand, if it is determined in step S527 that the cost level of the provisionally designated data center is not equal to or lower than the accounting level designated for the application, the management software program 110 judges whether or not the possibility to locate the partial copy at the data center of the cost level higher than the accounting level has been checked with the user (S528). For example, if it is possible to operate the application only at the data center of the cost level higher than the accounting level, a screen to check whether the partial copy may be located at the data center of the cost level higher than the accounting level is displayed on the display screen of the user terminal.

If it is determined in step S528 that the check with the user was performed, the management software program 110 decides the provisionally designated data center as the copy destination of the partial copy (S529). On the other hand, if it is determined in step S528 that the check with the user was not performed, the management software program 110 terminates the processing.

(2-4) Advantageous Effects of this Embodiment

As described above, a DC where data can be located can be decided based on the accounting level which is set to each application according to this embodiment. As a result, a full copy or partial copy of data can be located at the data center where the disaster recovery system is constructed, in consideration of the accounting status of the user who uses the application.

REFERENCE SIGNS LIST

10 Data center
11 Management server
12 Business server
13 Storage apparatus
14, 15, 16 Networks
110 Management software program 111 Processor
112 Memory
113 Integrated storage device
114 Management tables
115 Data interface
116 Management interface
120 Application
130 Logical volume
131 Storage device
134 Processor
135 Cache memory
136 Disk controller
137 Program memory
138 Storage program product
139 Management tables
140 Data interface
141 Management interface

The invention claimed is:

1. A storage system for managing a plurality of data centers comprising:
a business server for executing an application in response to an input/output request;
a first storage system of a first data center that includes a first storage area, that is configured to store data in one or more volumes in response to a request from the business server; and
a management server for managing the plurality of data centers;
wherein the management server is configured to:
rank pages of the one or more volumes of the first storage area based on tier;
determine a second data center and a third data center from the plurality of data centers;
copy all pieces of data stored in the one or more volumes of the first storage area to one or more volumes of a second storage area managed by a second storage system of the second data center; and
copy a subset of the data stored in the one or more volumes of the first storage area to one or more storage areas of a third storage area managed by a third storage system of the third data center, wherein the subset of the data is determined based on the rank of the page on which the data is stored.

2. The storage system according to claim 1, wherein the subset of the data is further determined based on a frequency of access of the data stored in the first storage area.

3. The storage system according to claim 1, wherein the management server is further configured to determine the second and the third data center based on ranking each of the plurality of data centers based upon available resources of each of the data centers and selecting the data center with firstmost available resources to be the second data center and the data center with secondmost available resources to be the third data center.

4. The storage system according to claim 3, wherein the available resources of each of the data centers includes an unused capacity of the storage area managed by the storage system of each data center and a server resource amount or network resource amount required to execute the application.

5. The storage system according to claim 1, wherein the management server is further configured to:
decide the second data center to be a failover location, and
copy all pieces of data stored in the one or more volumes of the second storage area to the one or more volumes of the third storage area.

6. The storage system according to claim 1, wherein the management server is further configured to:
decide the third data center to be a failover location,
copy all pieces of data stored in the one or more volumes of the second storage area to the one or more volumes of the third storage area; and
obtain the data from the one or more volumes of the second storage area, if the data has been requested from one or more volumes of the first storage area that have not been copied.

7. The storage system according to claim 1, wherein the management server is further configured to:
decide if either the second data center or the third data center is a failover location based on which data center has a larger resource amount.

8. The storage system according to claim 1, wherein if a plurality of applications are executed in the business server,
the management server is further configured to decide a failover location for one or more of the plurality of applications, based upon ranking the plurality of applications in descending order of required resources needed to execute the application.

9. The storage system according to claim 1, wherein if it is predicted that a required resource amount for the application executed at the first data center exceeds a specified threshold value, the management server is further configured to:
make an application of low priority operate at the second data center or the third data center whichever is the data center with a larger remaining resource amount.

10. The storage system according to claim 1, wherein the management server is further configured to:
determine the second data center and the third data center from the plurality of data centers based on an accounting level and a cost level for each of the plurality of data centers.

11. A storage system for managing a plurality of data centers comprising:
a business server for executing an application in response to an input/output request;
a first storage system of a first data center that includes a first storage area, that is configured to store data in one or more volumes in response to a request from the business server; and
a management server for managing the plurality of data centers; and
wherein the management server is configured to:
rank pages of the one or more volumes of the first storage area based on tier;
determine a second data center and a third data center from the plurality of data centers based on available resources of each of the plurality of data centers;
determine a failover location from the plurality of data centers;
copy all pieces of data stored in the one or more volumes of the first storage area to one or more volumes of a second storage area managed by a second storage system of the second data center;
copy a subset of the data stored in the one or more volumes of the first storage area to one or more volumes of a third storage area managed by a third storage system of the third data center based on the rank of the page on which the data is stored and a frequency of access of the data;
copy all pieces of data from the one or more volumes of the second storage area to the one or more volumes of the third storage area, if the first storage system of the first data center fails and the second data center is determined to be the failover location;
copy all pieces of data from the one or more volumes of the second storage area to the one or more volumes of the third storage area, if the system of the first data center fails and the third data center is determined to be the failover location; and obtain data from the one or more volumes of the third storage area, if the data has been requested from one or more volumes of the first storage area that have not been copied.

12. A data management method for a storage system for managing a plurality of data centers comprising:

executing, by a business server, an application in response to an input/output request;

ranking pages of one or more volumes of a first storage area managed by a first storage system of a first data center based on tier;

determining a second data center and a third data center from the plurality of data centers based on available resources of each of the plurality of data centers;

determining a failover location from the plurality of data centers;

copying, by a management server, all pieces of data stored in the one or more volumes of the first storage area to the one or more volumes of a second storage area managed by a second storage system of the second data center;

determining a subset of the data stored in the one or more volumes of the first storage area based on the ranking of the page on which the data is stored; and copying, by the management server, the subset of the data stored in the one or more volumes of the first storage area to one or more volumes of a third storage area managed by a third storage system of the third data center.

* * * * *